United States Patent
Suzuki et al.

(10) Patent No.: US 7,167,282 B2
(45) Date of Patent: Jan. 23, 2007

(54) IMAGE SCANNING APPARATUS, METHOD, AND SYSTEM, CONTROL METHOD THEREOF, STORAGE MEDIUM, AND EXTERNAL APPARATUS

(75) Inventors: Nobukazu Suzuki, Kawasaki (JP); Takashi Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 10/638,382

(22) Filed: Aug. 12, 2003

(65) Prior Publication Data
US 2004/0027622 A1 Feb. 12, 2004

Related U.S. Application Data

(62) Division of application No. 09/290,574, filed on Apr. 13, 1999, now Pat. No. 6,646,766.

(30) Foreign Application Priority Data

| Apr. 16, 1998 | (JP) | 10-121678 |
| May 14, 1998 | (JP) | 10-131906 |
| May 14, 1998 | (JP) | 10-131907 |
| Jun. 1, 1998 | (JP) | 10-151666 |
| Jun. 1, 1998 | (JP) | 10-151667 |

(51) Int. Cl.
H04N 1/04 (2006.01)
H04N 1/32 (2006.01)

(52) U.S. Cl. ............ 358/474; 358/442; 358/468; 358/486; 358/488

(58) Field of Classification Search ............ 358/442, 358/468, 1.15, 1.13, 474, 473, 497, 412, 358/409, 486, 487, 506, 505, 494, 406; 725/115–117; 348/211.14, 211.6, 552, 211.16; 399/77, 399/79, 90; 382/312, 313; 250/234–236, 250/208.1, 216
See application file for complete search history.

(56) References Cited

U.S. PATENT DOCUMENTS

| 5,260,742 A | 11/1993 | Kikkawa ............ 399/83 |
| 5,721,423 A * | 2/1998 | Hamamoto ............ 250/208.1 |
| 5,778,198 A * | 7/1998 | Kadota ............ 710/106 |
| 5,797,067 A | 8/1998 | Mitekura ............ 399/79 |
| 5,809,363 A * | 9/1998 | Kitamura et al. ............ 399/8 |
| 5,920,342 A * | 7/1999 | Umeda et al. ............ 348/211.14 |
| 5,940,117 A | 8/1999 | Hassan et al. ............ 725/115 |
| 5,966,219 A | 10/1999 | Mori ............ 358/442 |
| 6,289,134 B1 * | 9/2001 | Kondo et al. ............ 382/274 |
| 6,295,071 B1 | 9/2001 | Mikuni et al. ............ 345/619 |
| 6,327,001 B1 | 12/2001 | Yamagishi ............ 348/552 |
| 6,473,811 B1 * | 10/2002 | Onsen ............ 710/15 |
| 6,483,539 B1 | 11/2002 | Yamagishi ............ 348/211.6 |

(Continued)

FOREIGN PATENT DOCUMENTS

JP 5083948 4/1993

(Continued)

*Primary Examiner*—Cheukfan Lee
(74) *Attorney, Agent, or Firm*—Morgan & Finnegan LLP

(57) ABSTRACT

This invention has as its object to provide an image scanning method which can reduce the load of user operation, and can improve operation efficiency. To achieve this object, a scanning driver is started, and then the current scanning mode is detected on the basis of the previous scanning mode.

18 Claims, 17 Drawing Sheets

U.S. PATENT DOCUMENTS

| | | | |
|---|---|---|---|
| 6,483,599 B1 | 11/2002 | Woodman et al. | 358/1.15 |
| 2002/0057352 A1 | 5/2002 | Yamagishi | 348/231.6 |
| 2002/0087362 A1 | 7/2002 | Cobb et al. | 705/3 |

FOREIGN PATENT DOCUMENTS

| | | |
|---|---|---|
| JP | 06176114 A * | 6/1994 |
| JP | A 06-176114 | 6/1994 |
| JP | A 09-163209 | 6/1997 |
| JP | A 10-013561 | 1/1998 |
| JP | 10-126585 | 5/1998 |

\* cited by examiner

ORIGINAL FEED DIRECTION

IMAGE SCANNING APPARATUS, METHOD, AND SYSTEM, CONTROL METHOD THEREOF, STORAGE MEDIUM, AND EXTERNAL APPARATUS

This is a divisional of application Ser. No. 09/290,574, filed on Apr. 13, 1999, now U.S. Pat. No. 6,646,766.

BACKGROUND OF THE INVENTION

The present invention relates to an image scanning apparatus, method, and system, a control method thereof, a storage medium, and an external apparatus.

Conventionally, when image data drawn on an original (to be referred to as an "original image" hereinafter) is scanned by an image scanning apparatus with an original feed function, the image scanning apparatus is connected to an information processing apparatus such as a personal computer or the like. Then, the user operates the information processing apparatus to select a scanning mode, i.e., whether the original image is scanned in a preview mode or in a so-called main scanning mode. The image scanning apparatus scans the original image in the selected scanning mode.

More specifically, in a conventional image scanning system of this type, as shown in the flow chart in FIG. 6, the user starts a scanning driver (step S101), and then selects a scanning mode by pressing a main scan or preview button before he or she presses a start button (step S102→step S103→step S105 or step S102→step S103→step S104→step S106). After the scanning mode is selected, the user presses the start button, and the system executes a predetermined scan in accordance with the selected scanning mode (main scan or preview mode) (step S102→step S107→step S109 or step S102→step S107→step S108).

In this way, in the image scanning system, the scanning mode is designated before the start button is pressed, and the image scanning apparatus then scans an original image.

However, in the conventional image scanning system, when an original image is scanned using the image scanning apparatus, scans are normally made in a predetermined scan pattern, i.e., a scan in the preview mode and then that in the main scanning mode. However, the user must set the scanning mode for each scan, resulting in a heavy operation load on the user.

In a conventional original feed type image scanning apparatus (to be referred to as a sheet-feed scanner" hereinafter), an external switch provided to this image scanning apparatus is used for starting an image scan when the image scanning apparatus does not scan an image, and is used for stopping an image scan during the image scan. An automatic document feeder equipped to a copying machine or the like normally automatically exhausts an original from the feeder when an image scan is stopped.

However, a sheet-feed scanner of this type has a relatively low original feed speed. When an original is inserted with a skew, if that original is automatically exhausted, it may jam (so-called "paper jam"). For this reason, original feeding is stopped when the user stops an image scan, and the user must manually remove the original from the image scanning apparatus.

With this arrangement, when the user stops an image scan, the original is not fed and is left in the image scanning apparatus. The user must remove that original from the image scanning apparatus.

In such original image scanning apparatus, the external switch is used for starting or stopping an original scan. Hence, when the functions of a plurality of image scanning apparatuses are started by corresponding external switches, a plurality of external switches are required.

In a conventional image scanning apparatus which scans information on an original using an image sensor, and converts it into an electrical image signal, when the user wants to see a preview image of the original, he or she must connect the image scanning apparatus to an external apparatus, start image scanning software of that external apparatus, and see the preview image in that software.

More specifically, when the user wants to confirm the original, he or she must connect the image scanning apparatus to the external apparatus, start image scanning software in the external apparatus, and see a preview image in that software, resulting in cumbersome procedure.

In such image scanning apparatus, when the user wants to disconnect the image scanning apparatus from the external apparatus upon completion of an image scan, the user must disconnect the image scanning apparatus from the external apparatus after he or she ends the image scanning software running on the external apparatus.

More specifically, when the user wants to scan an image, he or she must connect the image scanning apparatus to the external apparatus, and start image scanning software on the external apparatus to scan an image. On the other hand, when the user wants to disconnect the image scanning apparatus from the external apparatus upon completion of the image scanning apparatus, he or she must end the image scanning software that is running on the external apparatus, and then disconnect the image scanning apparatus from the external apparatus, resulting in troublesome procedure.

SUMMARY OF THE INVENTION

The present invention has been made in consideration of the conventional problems, and has as its object to provide an image scanning system and method, which can improve operation efficiency by reducing the operation load on the user, and can increase the degree of freedom in setting the scanning mode by the user.

It is another object of the present invention to provide an image scanning apparatus which automatically discharges an original from the apparatus when an image scan is stopped, thus obviating the need for manually removing an original from the image scanning apparatus.

It is still another object of the present invention to provide an image scanning apparatus which can use a single external switch not only as a trigger for starting an original scan but also as a trigger for executing another function.

It is still another object of the present invention to provide an image scanning system, its control method, external apparatus, and storage medium, which allow easy confirmation of an image in an image reading apparatus.

It is still another object of the present invention to provide an image scanning system, its control method, external apparatus, and storage medium, which can easily start and end an object scan in an image scanning apparatus.

In order to solve the aforementioned problems and to achieve the objects, an image scanning system according to the present invention is characterized by comprising the following arrangement according to its first aspect.

That is, there is provided an image scanning system which comprises image scanning means for scanning image data on an original on the basis of a predetermined scanning mode while feeding an original, and display means for displaying the image data scanned by the image scanning means, comprising: storage means for storing the scanning mode used by the image scanning means; and scanning mode determination means for determining a scanning mode upon next scan on the basis of the scanning mode stored in the storage means.

An image scanning method according to the present invention is characterized by the following arrangement according to its first aspect.

That is, there is provided an image scanning method which includes the scanning mode designation step of selecting and designating a scanning mode of image data drawn on an original from a plurality of scanning modes, the image scanning step of scanning the image data on the basis of the designated scanning mode while feeding the original, and the display step of displaying the image data scanned in the image scanning step, comprising: the scanning mode determination step of storing the scanned mode used in the image scanning step, and determining a scanning mode upon next scan on the basis of the stored scanning mode.

A storage medium according to the present invention is characterized by the following arrangement according to its first aspect.

That is, there is provided a storage medium that stores a control program for controlling an image scanning apparatus, the control program having: a code of the scanning mode designation step of selecting and designating a scanning mode of image data drawn on an original from a plurality of scanning modes; a code of the image scanning step of scanning the image data on the basis of the designated scanning mode while feeding the original; a code of the display step of displaying the image data scanned in the image scanning step; and a code of the step of storing the scanned mode used in the image scanning step, and determining a scanning mode upon next scan on the basis of the stored scanning mode.

An image scanning apparatus according to the present invention is characterized by the following arrangement according to its first aspect.

That is, there is provided an original image scanning apparatus which has an image sensor for converting a scanned original image into an electrical image signal, an A/D converter for converting the image signal into a digital signal, means for transferring the digital image signal to an external apparatus, means for detecting if the original is placed, and switch detection means for starting or stopping a scan of the original, wherein the scan of the original is started by the switch detection means, the scan of the original is stopped by the switch detection means during the scan of the original, and the original is automatically fed in a forward direction by the switch detection means again in that state.

A method of controlling an image scanning apparatus according to the present invention is characterized by the following arrangement according to its first aspect.

That is, there is provided a method of controlling an original image scanning apparatus which has an image sensor for converting a scanned original image into an electrical image signal, an A/D converter for converting the image signal into a digital signal, means for transferring the digital image signal to an external apparatus, means for detecting if the original is placed, and switch detection means for starting or stopping a scan of the original, comprising: the step of starting the scan of the original by the switch detection means; the step of stopping the scan of the original by the switch detection means during the scan of the original; and the step of automatically feeding the original in a forward direction by the switch detection means again in that state.

A storage medium according to the present invention is characterized by the following arrangement according to its second aspect.

That is, there is provided a storage medium that stores a control program for controlling an original image scanning apparatus which has an image sensor for converting a scanned original image into an electrical image signal, an A/D converter for converting the image signal into a digital signal, means for transferring the digital image signal to an external apparatus, means for detecting if the original is placed, and switch detection means for starting or stopping a scan of the original, the control program having: a code of the step of starting the scan of the original by the switch detection means; a code of the step of stopping the scan of the original by the switch detection means during the scan of the original; and a code of the step of automatically feeding the original in a forward direction by the switch detection means again in that state.

An image scanning apparatus according to the present invention is characterized by the following arrangement according to its second aspect.

That is, there is provided an original image scanning apparatus which has an image sensor for converting a scanned original image into an electrical image signal, an A/D converter for converting the image signal into a digital signal, means for transferring the digital image signal to an external apparatus, and a switch for starting a scan of the original, wherein the number of times the switch is pressed per unit time is detected.

An image scanning apparatus according to the present invention is characterized by the following arrangement according to its third aspect.

That is, there is provided an original image scanning apparatus which has an image sensor for converting a scanned original image into an electrical image signal, an A/D converter for converting the image signal into a digital signal, means for transferring the digital image signal to an external apparatus, and a switch for starting a scan of the original, wherein time intervals between adjacent ones of a plurality of times of depression of the switch, i.e., between first and second depressions of the switch, between second and third depressions of the switch, . . . , are measured, and a function of the original image scanning apparatus is changed depending on the measured time interval to execute the scan of the original.

A method of controlling an image scanning apparatus according to the present invention is characterized by the following arrangement according to its second aspect.

That is, there is provided a method of controlling an original image scanning apparatus which has an image sensor for converting a scanned original image into an electrical image signal, an A/D converter for converting the image signal into a digital signal, means for transferring the digital image signal to an external apparatus, and a switch for starting a scan of the original, comprising: the step of detecting the number of times the switch is pressed per unit time.

A method of controlling an image scanning apparatus according to the present invention is characterized by the following arrangement according to its third aspect.

That is, there is provided a method of controlling an original image scanning apparatus which has an image sensor for converting a scanned original image into an electrical image signal, an A/D converter for converting the image signal into a digital signal, means for transferring the digital image signal to an external apparatus, and a switch for starting a scan of the original, comprising: the step of measuring time intervals between adjacent ones of a plurality of times of depression of the switch, i.e., between first and second depressions of the switch, between second and third depressions of the switch, . . . , and changing a function of the original image scanning apparatus depending on the measured time interval to execute the scan of the original.

A storage medium according to the present invention is characterized by the following arrangement according to its third aspect.

That is, there is provided a storage medium that stores a control program for controlling an original image scanning apparatus which has an image sensor for converting a scanned original image into an electrical image signal, an A/D converter for converting the image signal into a digital signal, means for transferring the digital image signal to an external apparatus, and a switch for starting a scan of the original, the control program having: a code of the step of detecting the number of times the switch is pressed per unit time.

A storage medium according to the present invention is characterized by the following arrangement according to its fourth aspect.

That is, there is provided a storage medium that stores a control program for controlling an original image scanning apparatus which has an image sensor for converting a scanned original image into an electrical image signal, an A/D converter for converting the image signal into a digital signal, means for transferring the digital image signal to an external apparatus, and a switch for starting a scan of the original, the control program having: a code of the step of measuring time intervals between adjacent ones of a plurality of times of depression of the switch, i.e., between first and second depressions of the switch, between second and third depressions of the switch, . . . , and changing a function of the original image scanning apparatus depending on the measured time interval to execute the scan of the original.

An image reading system according to the present invention is characterized by the following arrangement according to its second aspect.

That is, there is provided an image scanning system comprising: an image scanning apparatus for scanning information on an object using an image sensor, and outputting an electrical image signal to an external unit; and an external apparatus for controlling the image scanning apparatus, and displaying the image signal output from the image scanning apparatus, wherein the external apparatus comprises connection means for connecting the image scanning apparatus to the external apparatus, detection means for detecting if the image scanning apparatus is connected to the external apparatus by the connection means, and control means for starting software for controlling the image scanning apparatus on the basis of a detection signal from the detection means.

A method of controlling an image reading system according to the present invention is characterized by the following arrangement according to its first aspect.

That is, there is provided a method of controlling an image scanning system which comprises an image scanning apparatus for scanning information on an object using an image sensor, and outputting an electrical image signal to an external unit, and an external apparatus for controlling the image scanning apparatus, and displaying the image signal output from the image scanning apparatus, comprising: the detection step of detecting if the image scanning apparatus is connected to the external apparatus; and the start step of starting software for controlling the image scanning apparatus on the basis of a detection result in the detection step.

A storage medium according to the present invention is characterized by the following arrangement according to its fifth aspect.

That is, there is provided a storage medium that stores a control program for controlling an image scanning system which comprises an image scanning apparatus for scanning information on an object using an image sensor, and outputting an electrical image signal to an external unit, and an external apparatus for controlling the image scanning apparatus, and displaying the image signal output from the image scanning apparatus, the control program having: a code of the detection step of detecting if the image scanning apparatus is connected to the external apparatus; and a code of the start step of starting software for controlling the image scanning apparatus on the basis of a detection result in the detection step.

An external apparatus according to the present invention is characterized by the following arrangement according to its first aspect.

That is, there is provided an external apparatus which is connected to an image scanning apparatus for scanning information on an object using an image sensor, and outputting an electrical image signal to an external unit, and controls the image scanning apparatus, comprising: connection means for connecting the image scanning apparatus to the external apparatus; detection means for detecting if the image scanning apparatus is connected to the external apparatus by the connection means; and control means for starting software for controlling the image scanning apparatus on the basis of a detection signal from the detection means.

An image scanning system according to the present invention is characterized by the following arrangement according to its third aspect.

That is, there is provided an image scanning system comprising: an image scanning apparatus for scanning information on an object using an image sensor, and outputting an electrical image signal to an external unit; and an external apparatus for controlling the image scanning apparatus, and displaying the image signal output from the image scanning apparatus, wherein the external apparatus comprises connection means for connecting the image scanning apparatus to the external apparatus, detection means for detecting whether or not the image scanning apparatus is connected to the external apparatus by the connection means, and control means for controlling whether software for controlling the image scanning apparatus is started or quitted on the basis of a detection signal from the detection means.

A method of controlling an image scanning system according to the present invention is characterized by the following arrangement according to its second aspect.

That is, there is provided a method of controlling an image scanning system which comprises an image scanning apparatus for scanning information on an object using an image sensor, and outputting an electrical image signal to an external unit, and an external apparatus for controlling the image scanning apparatus, and displaying the image signal output from the image scanning apparatus, comprising: the detection step of detecting whether or not the image scanning apparatus is connected to the external apparatus by the connection means; and the setting step of setting whether software for controlling the image scanning apparatus in the external apparatus is started or quitted on the basis of a detection result in the detection step.

A storage medium according to the present invention is characterized by the following arrangement according to its sixth aspect.

That is, there is provided a storage medium that stores a control program for controlling an image scanning system which comprises an image scanning apparatus for scanning information on an object using an image sensor, and outputting an electrical image signal to an external unit, and an external apparatus for controlling the image scanning apparatus, and displaying the image signal output from the image scanning apparatus, the control program comprising: a code of the detection step of detecting whether or not the image scanning apparatus is connected to the external apparatus by the connection means; and a code of the setting step of setting whether software for controlling the image scanning apparatus in the external apparatus is started or quitted on the basis of a detection result in the detection step.

An external apparatus according to the present invention is characterized by the following arrangement according to its second aspect.

That is, there is provided an external apparatus which is connected to an image scanning apparatus for scanning information on an object using an image sensor, and externally outputting an electrical image signal, and controls the image scanning apparatus, comprising: connection means for connecting the image scanning apparatus to the external apparatus; detection means for detecting whether or not the image scanning apparatus is connected to the external apparatus by the connection means; and control means for controlling whether software for controlling the image scanning apparatus is started or quitted on the basis of a detection signal from the detection means.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The preferred embodiments of the present invention will be described in detail hereinafter with reference to the accompanying drawings.

(First Embodiment)

Figure 1:
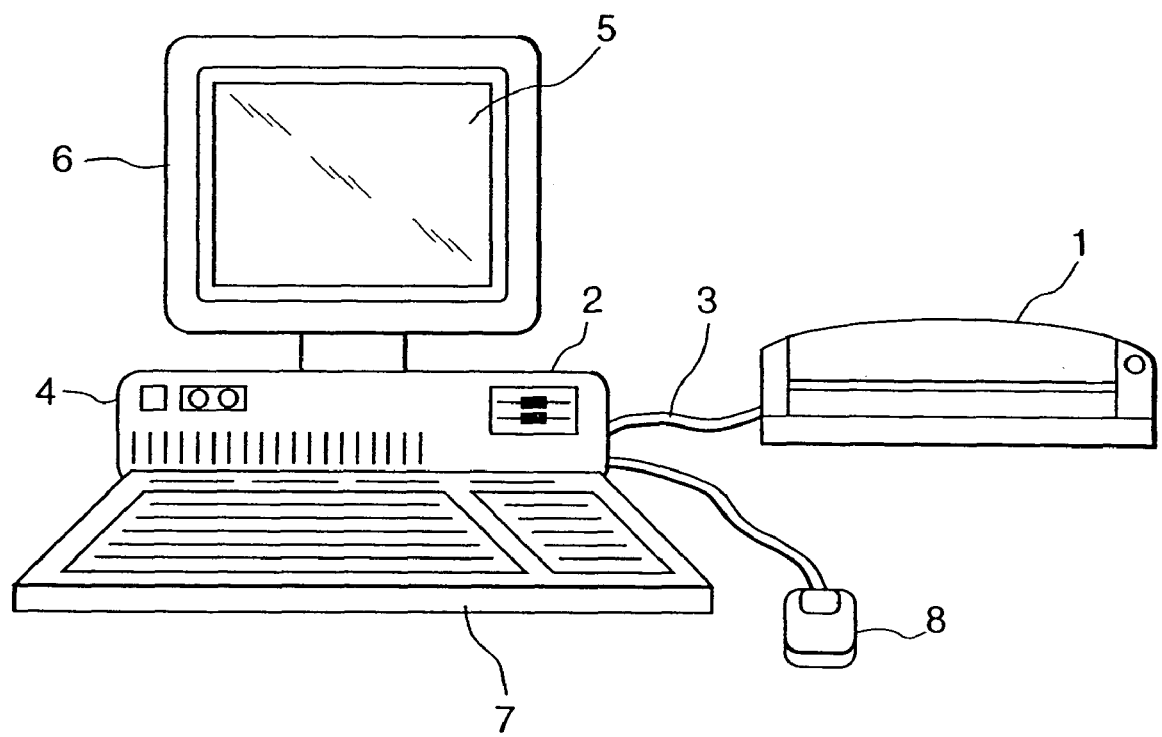
FIG. 1 is a view showing the arrangement of an image scanning system according to the first embodiment of the present invention.

FIG. 1 is a view showing the arrangement of an image scanning system according to the first embodiment of the present invention. The image scanning system is constructed by connecting an image scanning apparatus with an original feed function (to be referred to as a "sheet-feed scanner" hereinafter) 1, and a personal computer 2 having a window environment for controlling the sheet-feed scanner 1 via a connection cable 3.

The personal computer 2 is constituted by a personal computer main body 4, a display unit 6 comprising a display screen 5 such as a color monitor or the like, a keyboard 7 used by the user to input various commands, and a pointing device (mouse) 8 for, e.g., designating an object displayed on the display screen 5.

Figure 2:
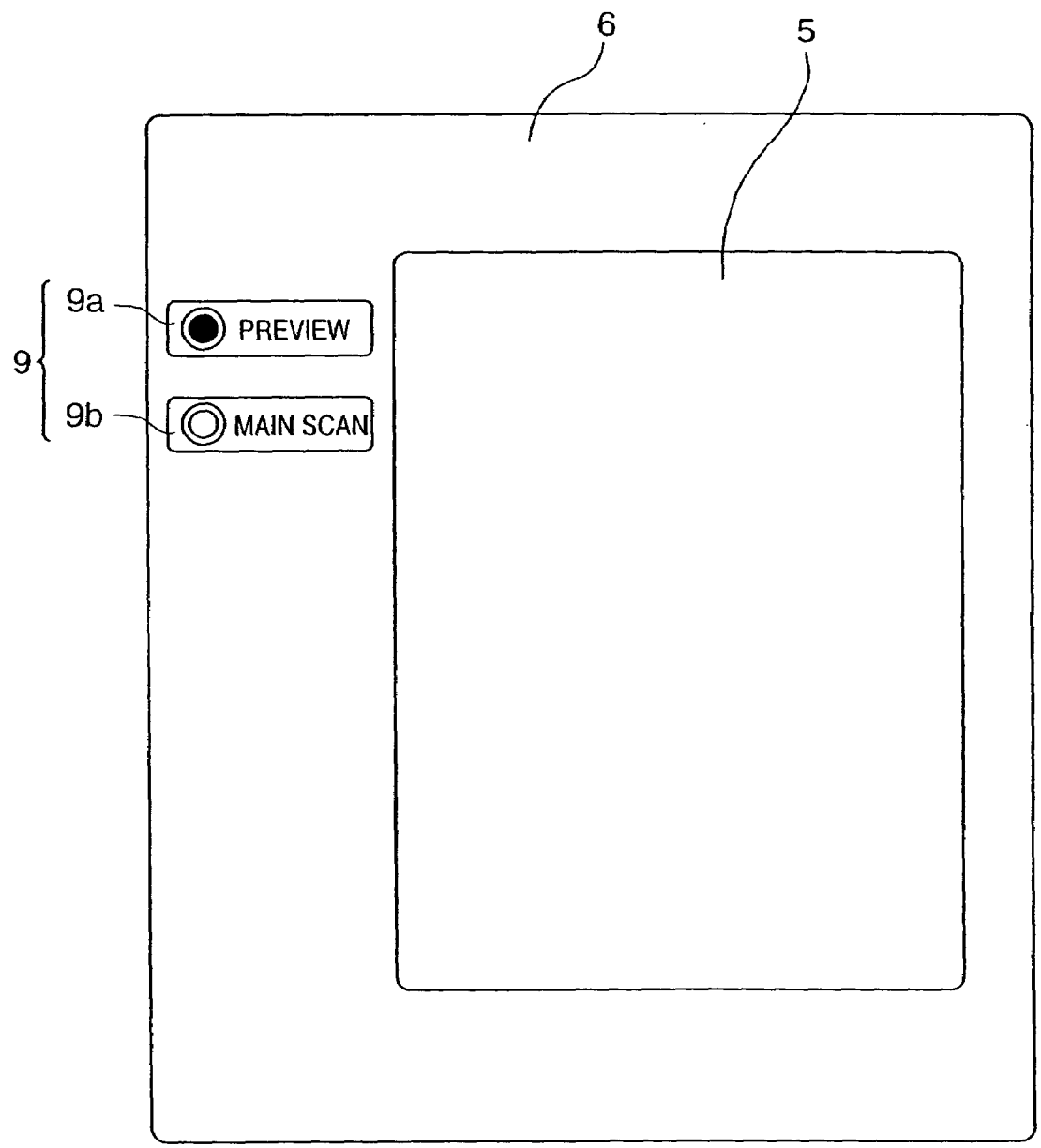
FIG. 2 is an enlarged front view of a display unit.

As shown in FIG. 2, the display unit 6 has scanning mode setting buttons 9 at appropriate positions outside the display screen 5. The scanning mode setting buttons 9 have a preview button 9a and main scan button 9b. Upon pressing the preview button 9a, a desired portion to be scanned in an original image is preview-displayed on the display screen 5. Upon pressing the main scan button 9b, the preview-displayed image data is scanned.

Figure 3:
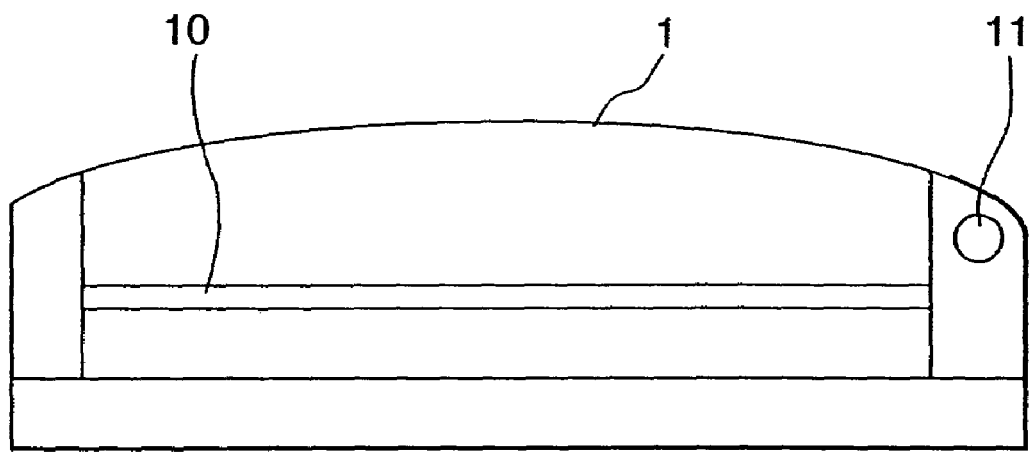
FIG. 3 is an enlarged front view of a sheet-feed scanner.

As shown in FIG. 3, the sheet-feed scanner 1 comprises an image scanner (not shown) for scanning an original image, an insertion port 10 for inserting an original, and a start button 11 for instructing to start feeding of the inserted original. Upon pressing the start button 11, the original inserted into the insertion port 10 is fed into the sheet-feed scanner, and a desired original image is scanned by the internal image scanner of the sheet-feed scanner 1. The scanned original image is displayed on the display screen 5 of the display unit 6.

Figure 4:
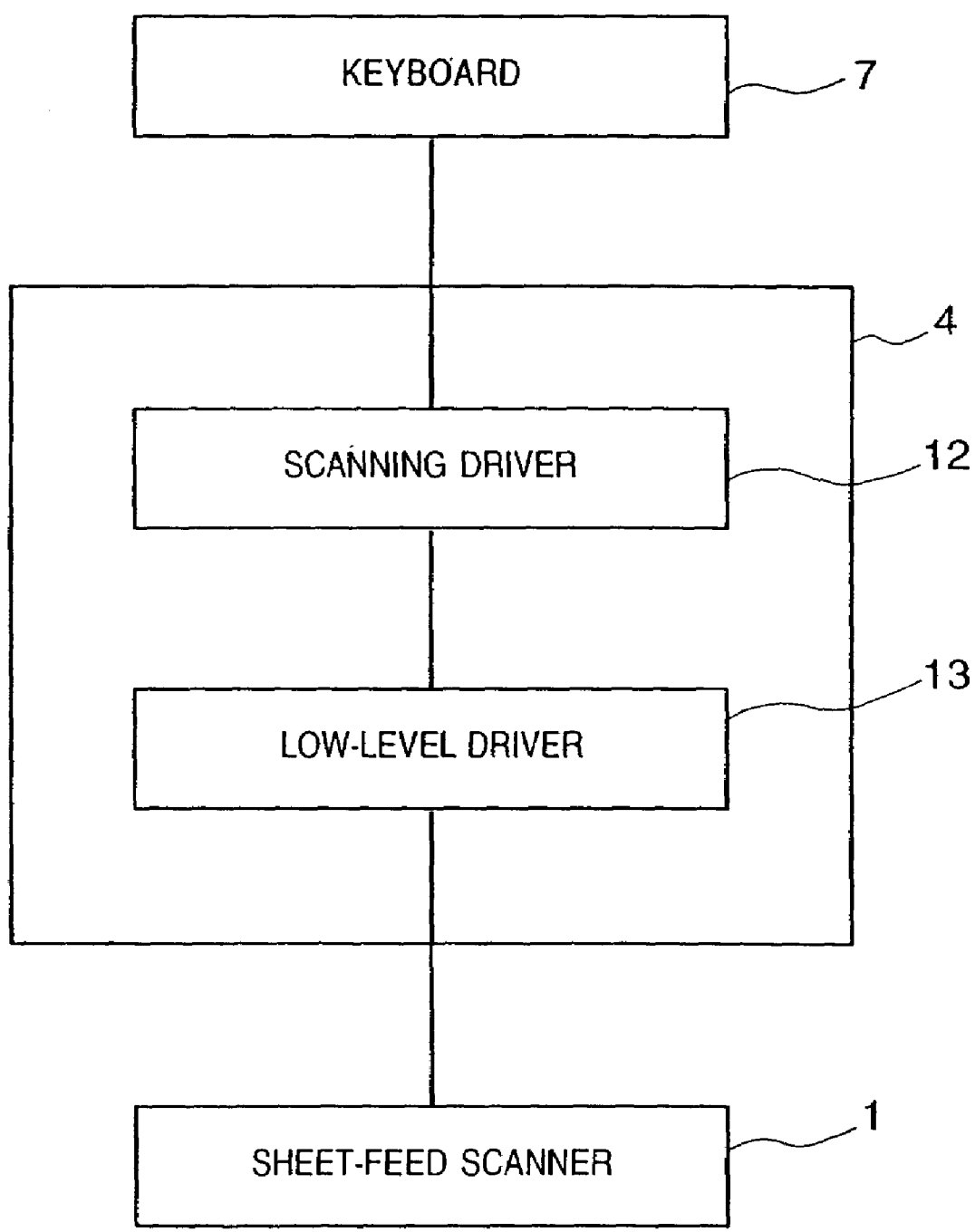
FIG. 4 is a block diagram showing principal part of a control system of the image scanning system.

FIG. 4 is a block diagram showing principal part of a control system of the image scanning system. The personal computer main body 4 has a scanning driver 12 that interfaces with the keyboard 7, and a low-level driver 13 that interfaces with the sheet-feed scanner 1. The scanning driver 12 comprises a storage means for storing a scanning mode upon scanning by the sheet-feed scanner 1, and a scanning mode determination means for determining the next scanning mode on the basis of the contents of the storage means.

Figure 5:
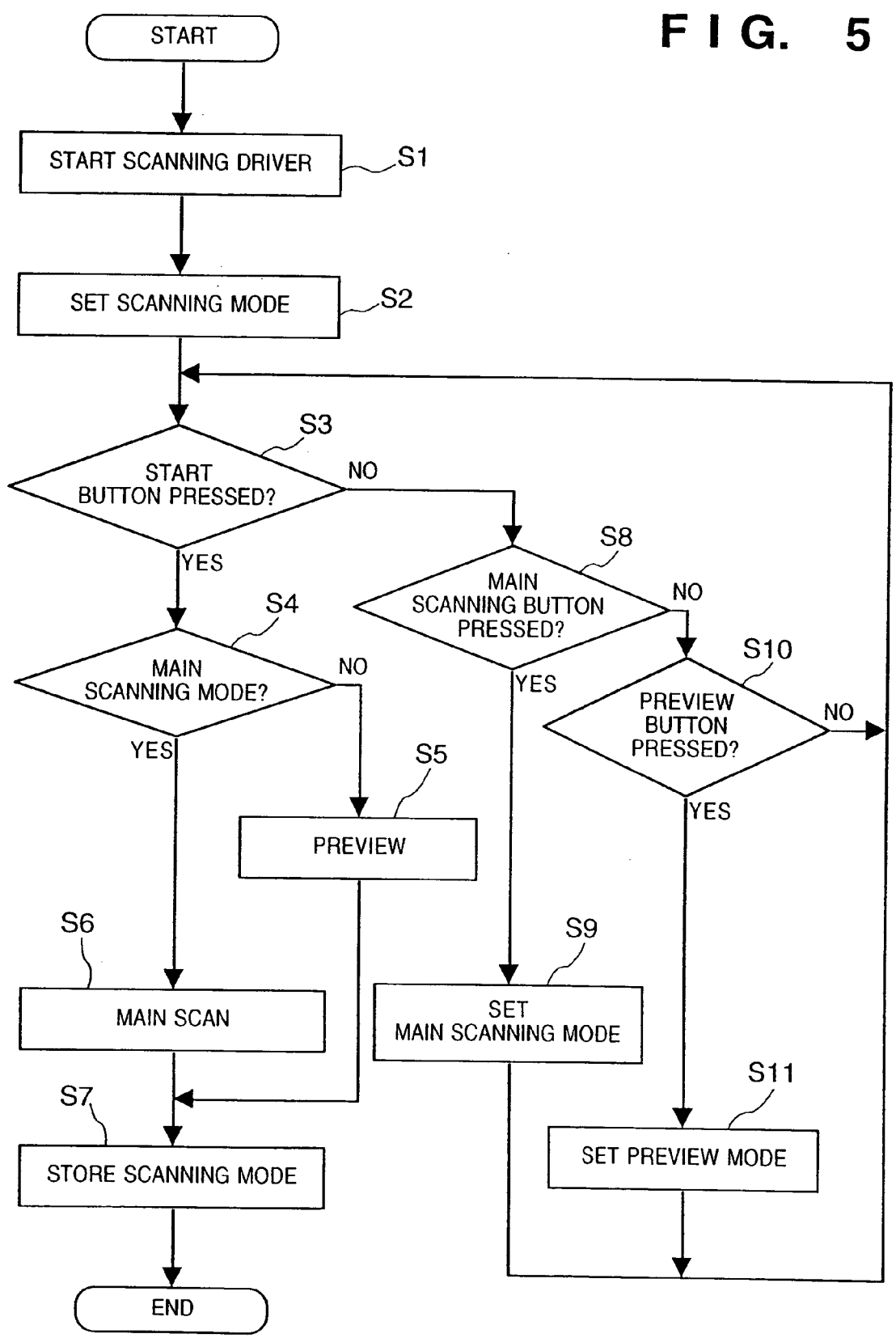
FIG. 5 is a flow chart showing the operation of an image scanning apparatus of the first embodiment.
Figure 6:
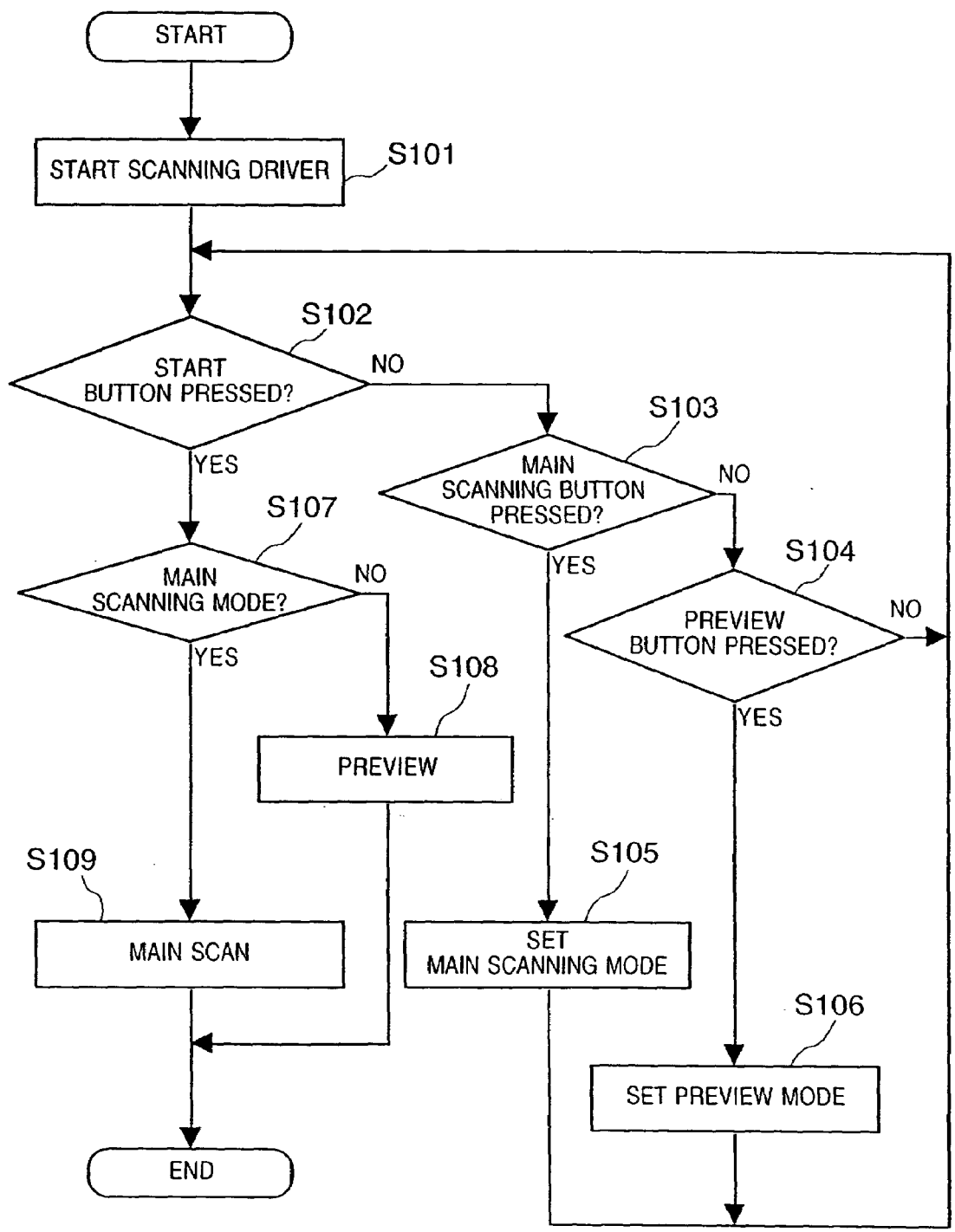
FIG. 6 is a flow chart showing a conventional image scanning method.

FIG. 5 is a flow chart showing the scanning sequence of an image scanning method of the first embodiment.

The user operates the keyboard 7 to start the scanning driver 12 in step S1, and then sets a scanning mode in step S2. In this embodiment, if the previous scanning mode is the preview mode, the scanning mode is automatically switched to the main scanning mode; if the previous scanning mode is the main scanning mode, the scanning mode is automatically switched to the preview mode. More specifically, of the scanning mode setting buttons 9 (FIG. 2), a button corresponding to a scanning mode different from the previous scanning mode is activated by the scanning driver 12.

It is then checked in step S3 if the user has pressed the start button 11. If it is determined that the user has pressed the start button 11, the flow advances to step S4 to check if the main scanning mode is set. If NO in step S4, i.e., if the current scanning mode is the preview mode in step S2 since the previous scanning mode is the main scanning mode, an image scan is executed in the preview mode (step S5), and the flow then advances to step S7. On the other hand, if YES in step S4, i.e., if the current scanning mode is the main scanning mode in step S2 since the previous scanning mode is the preview mode, an image scan is executed in the main scan mode (step S6), and the flow advances to step S7.

In step S7, the currently executed scanning mode (preview or main scanning mode) is stored in the scanning driver 12, thus ending the process.

On the other hand, if it is determined in step S3 that the start button 11 is not pressed, the flow advances to step S8 to check if the user has pressed the main scanning button 9b. If YES in step S8, the main scanning mode is set (step S9), and the flow returns to step S3.

On the other hand, if NO in step S8, the flow advances to step S10 to check if the user has pressed the preview button 9a. If NO in step S10, the flow returns to step S3; if YES in step S10, the preview mode is set (step S11), and the flow then returns to step S3.

As described above, in this embodiment, the current scanning mode is stored, and the next scanning mode is automatically determined on the basis of that current scanning mode. Hence, the user need not set the scanning mode for each scan, thus improving operation efficiency. When the user makes scans not in a predetermined pattern, he or she can automatically set the scanning mode, thus improving convenience on the side of the operator.

Note that the present invention is not limited to the above embodiment. In this embodiment, in the scanning mode setting step (step S2), the preview and main scanning modes are alternately set. However, the scanning driver 12 may inhibit the scanning mode from being changed. Also, the setups may be preferably changed to repeat the preview or main scanning mode a plurality of number of times.

As described in detail above, according to the first embodiment, when the user makes scans not in a predetermined pattern, he or she can freely set the scanning mode, while the current scanning mode is stored, and the next scanning mode is determined based on the current scanning mode. Hence, the user need not set the scanning mode for each scan, thus improving operation efficiency.

(Second Embodiment)

Figure 7:
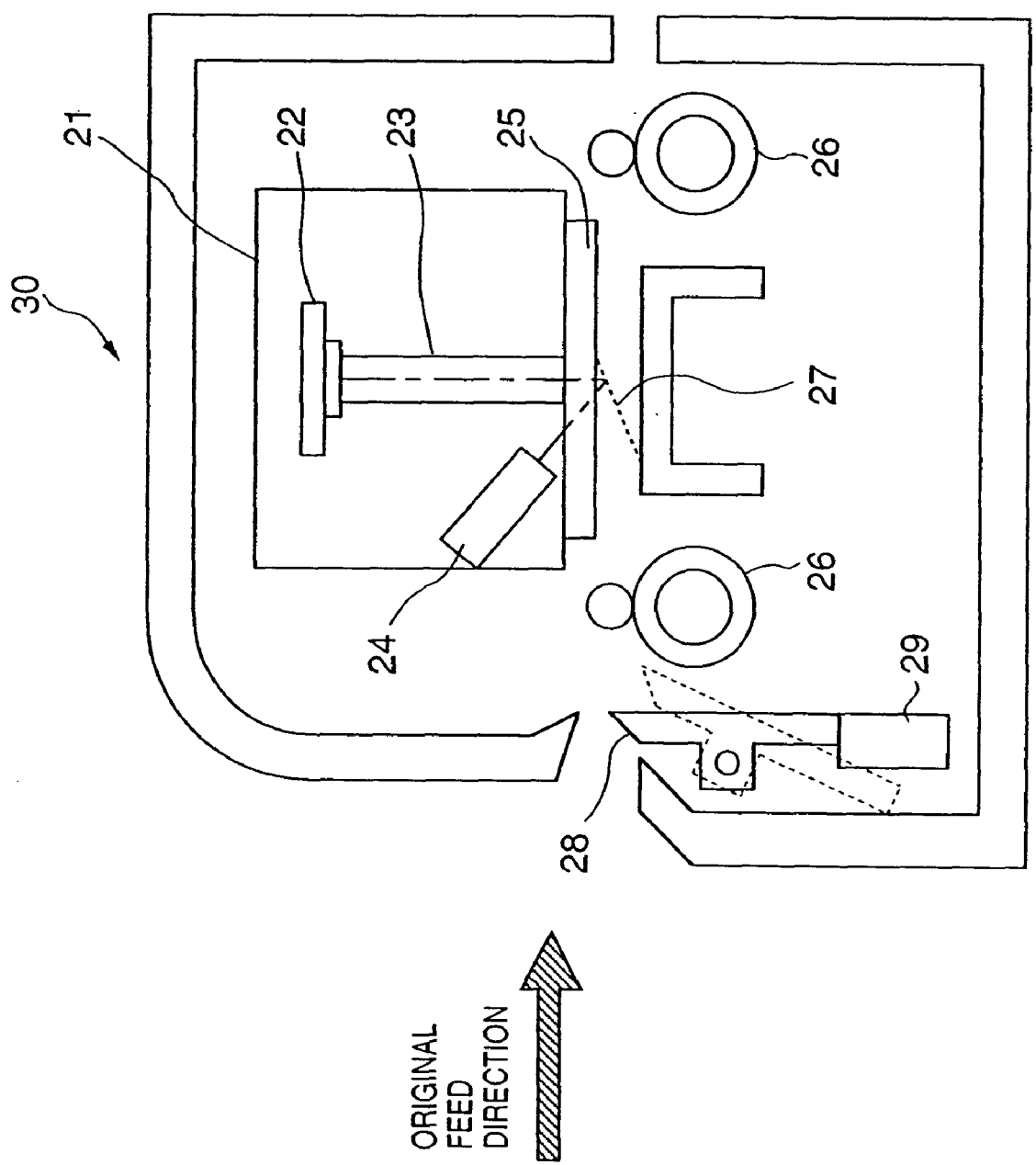
FIG. 7 is a sectional view showing the internal arrangement of an original image scanning apparatus according to the second embodiment.

FIG. 7 shows the internal arrangement of an original image scanning apparatus according to the second embodiment of the present invention.

Referring to FIG. 7, reference numeral 30 denotes an image scanning apparatus for scanning an image by feeding an original. Reference numeral 21 denotes a contact image sensor (to be referred to as a CIS hereinafter), which comprises a photodiode 22, SELFOC lens 23, LED array 24, and contact glass 25. Feed rollers 26 are placed in front of and behind the CIS 21, and move an original relative to the CIS 21. A contact sheet 27 is used for making an original contact the CIS 21.

An original detection lever 28 is used for detecting insertion of an original. Upon insertion of an original, the original detection lever 28 tilts to change an output signal from an original detection sensor 29. This output signal is supplied to a CPU 215 shown in FIG. 8 to determine insertion of the original. If it is determined that an original has been inserted, a driving motor (not shown) for rotating the feed rollers 26 to start original feeding, and to scan the original.

Figure 8:
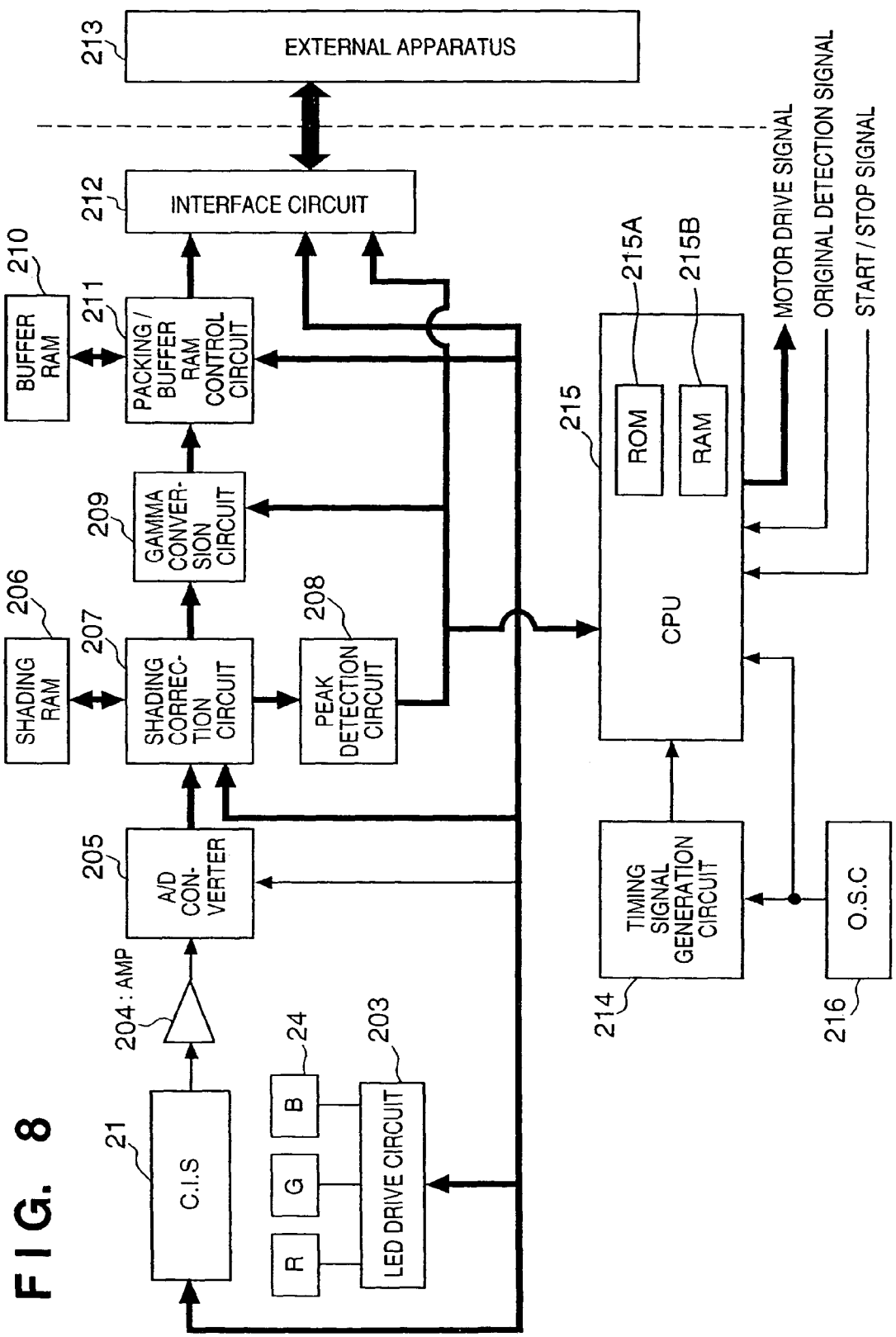
FIG. 8 is a block diagram showing the electrical arrangement of a control circuit of the second embodiment.

FIG. 8 is a block diagram showing the arrangement of a control circuit in this embodiment.

The circuit operation of this embodiment will be explained below with reference to FIG. 8.

Referring to FIG. 8, reference numeral 21 denotes the CIS that has already been explained, and is also integrated with the LED array 24 serving as a light source. While an original placed on the contact glass 25 of the CIS 21 is fed, an LED control circuit 203 selectively turns on the respective color LEDs in units of lines, thus scanning R, G, and B line-sequential color images.

An AMP 204 is an amplifier for amplifying a signal output from the CIS 21. Reference numeral 205 denotes an A/D converter for A/D-converting the amplified output to output, e.g., an 8-bit digital signal.

A shading RAM 206 stores shading correction data obtained by scanning a calibration sheet in advance, and a shading correction circuit 207 performs shading correction of the scanned image signal on the basis of the data stored in the shading RAM 206. A peak detection circuit 208 detects peak values in the scanned image data in units of lines, and is used for detecting the leading end of an original.

A gamma conversion circuit 209 performs gamma conversion of the scanned image data in accordance with a gamma curve set in advance by a host computer (in this case, an external apparatus 213).

A buffer RAM 210 temporarily stores image data to adjust the actual scanning timing to the communication timing with the host computer. A packing/buffer RAM control circuit 211 executes a process for packing data in accordance with an image output mode (binary, 4-bit multi-valued, 8-bit multi-valued, 24-bit multi-valued) set in advance by the host computer, and writing the packed data in the buffer RAM 210, and a process for reading out image data from the buffer RAM 210 and outputting that data to an interface circuit 212.

The interface circuit 212 exchanges control signals and outputs an image signal with the external apparatus 213 such as a personal computer or the like, which serves as a host apparatus of the image scanning apparatus 30.

Reference numeral 215 denotes the CPU in the form of, e.g., a microcomputer, which has a ROM 215A storing the processing sequence, and a work RAM 215B. The CPU 215 controls the respective units in accordance with the sequence stored in the ROM 215A. External switch information is input to the CPU 215 as a start/stop signal. The CPU 215 detects the number of input start/stop signals per unit time.

Reference numeral 216 denotes, e.g., a quartz oscillator; and 214, a timing signal generation circuit for generating various timing signals that serve as references for operations by frequency-dividing the oscillator 216 in accordance with the setups of the CPU 215.

Figure 9:
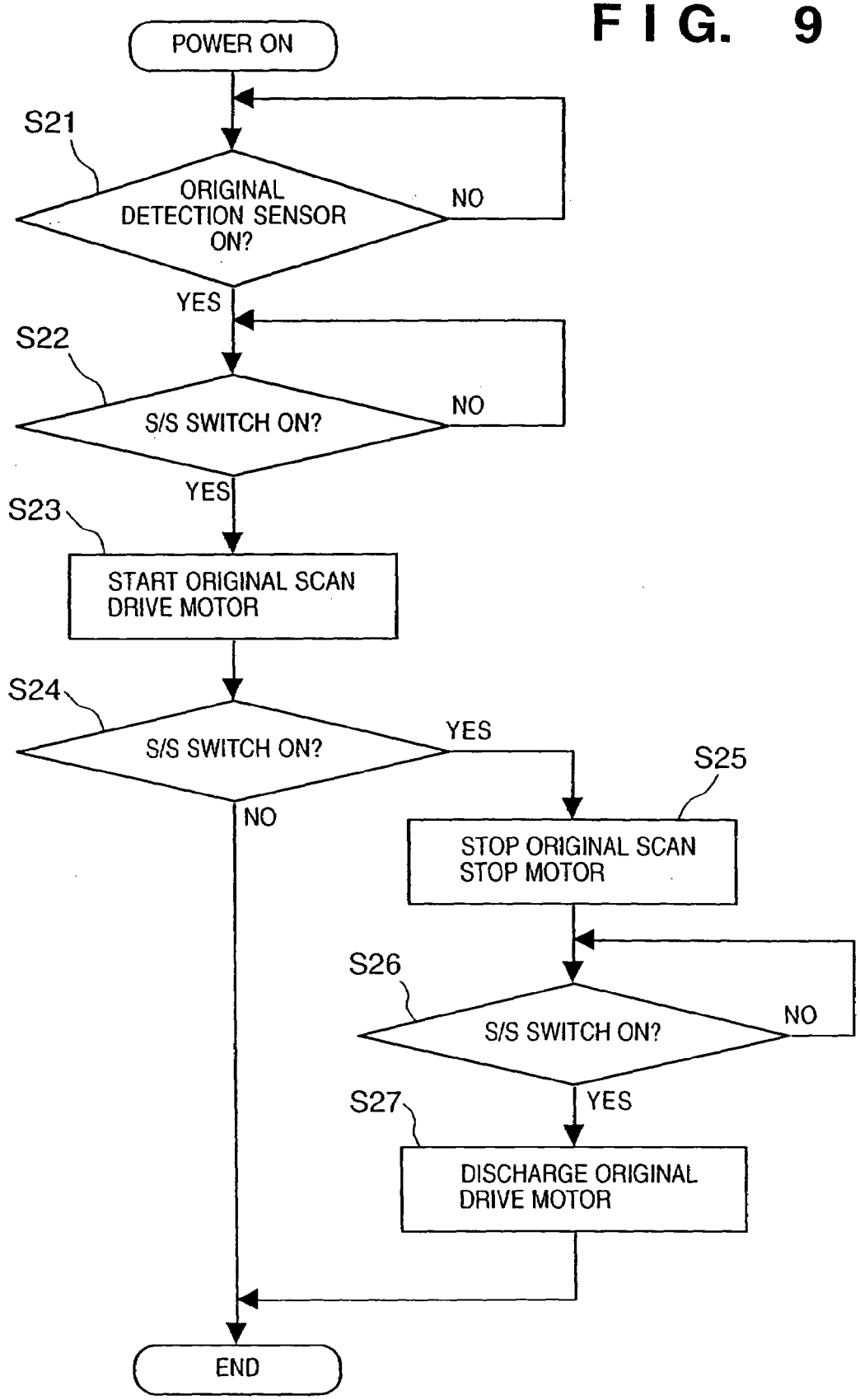
FIG. 9 is a flow chart showing the processing of the second embodiment.

The processing sequence of this embodiment will be described below with reference to the flow chart shown in FIG. 9.

After power ON, if the image scanning apparatus 30 detects insertion of an original upon ON of the original detection sensor 29 in step S21, the flow advances to step S22 and the control waits until the start/stop switch (to be referred to as an "S/S switch" hereinafter) is pressed.

If it is detected in step S22 that the S/S switch has been pressed, the flow advances to step S23, and the motor is driven to feed the original, so as to start an original scan. If it is detected in step S24 that the S/S switch has been pressed during the original can, the flow advances to step S25; otherwise, the operation ends after completion of the original image scan.

In step S25, the original scan is stopped, and the motor is stopped, thus interrupting original feeding. If it is detected in step S26 that the S/S switch has been pressed, the flow advances to step S27 to discharge the original. At this time, the motor is driven in the forward direction. After the original has been discharged, this control operation ends.

(Third Embodiment)

In the second embodiment, when the S/S switch has been pressed while the image scan is stopped, the motor is driven to discharge an original in the forward direction. In the third embodiment, however, the motor is driven in the reverse direction to discharge an original in the reverse direction.

When an original has skewed, if the motor is driven in the forward direction to discharge the original, paper jam may take place. However, when the motor is driven in the reverse direction to discharge an original, paper jam can be prevented.

Figure 10:
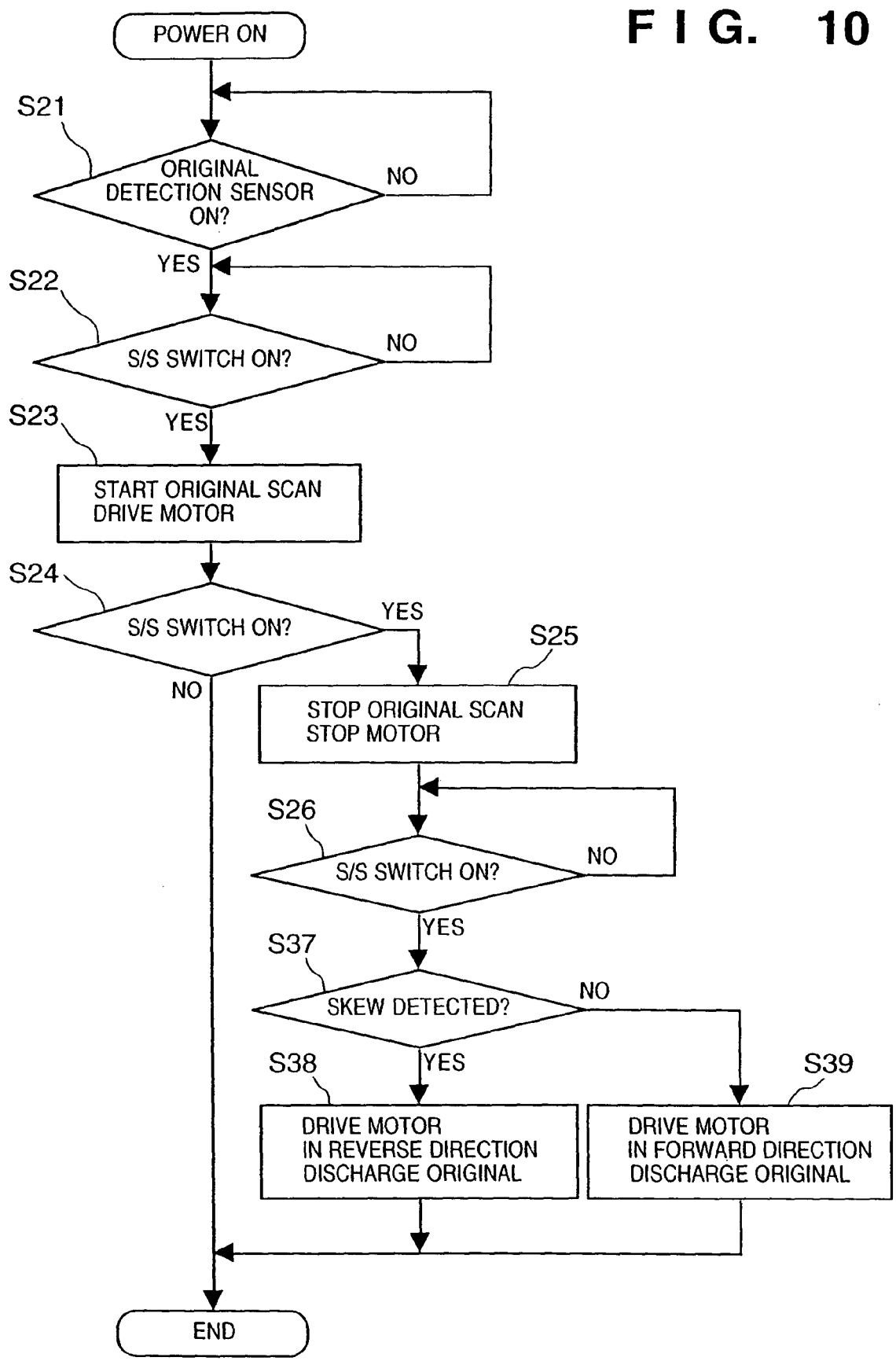
FIG. 10 is a flow chart showing the processing according to the third embodiment of the present invention.

When the CIS 21 reads the end of an original, and detects that the end position has shifted either to the right or left in the main scanning direction, it is determined that the original has skewed, and a skew detection signal is input to the CPU 215 (FIG. 8). In the operation sequence flow chart (FIG. 10) of this embodiment, steps S21 to S26 are the same as those in FIG. 9 of the second embodiment. It is checked based on the skew detection signal in step S37 in FIG. 10 if an original has skewed. If YES in step S37, the flow advances to step S38; otherwise, the flow advances to step S39. In step S38, since the original has skewed, the motor is driven in the reverse direction to discharge the original. In step S39, since the original has not skewed, the motor is driven in the forward direction to discharge the original.

To restate, according to the second and third embodiments, since an original can be automatically discharged from the original scanning apparatus using the external switch provided to the image scanning apparatus upon stopping an image scan, the user need not manually remove the original from the image scanning apparatus.

(Fourth Embodiment)

In the fourth embodiment, the arrangement of an original image scanning apparatus is the same as that in the second embodiment shown in FIG. 7, and the block diagram that shows the electrical arrangement of a control circuit is also the same as that in the second embodiment shown in FIG. 8, except for operations. Hence, only different operations will be explained below.

Figure 11:
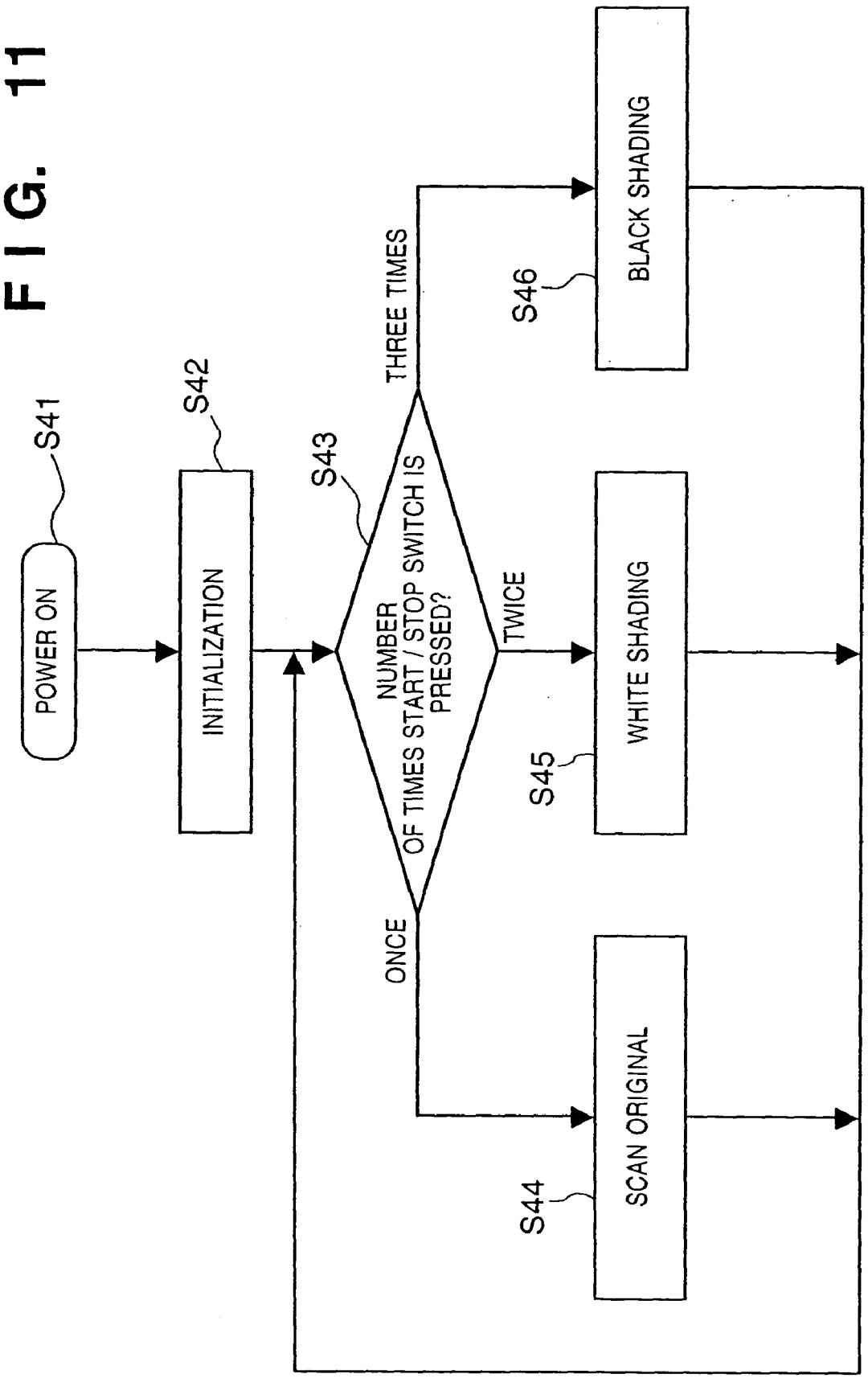
FIG. 11 is a flow chart showing the processing according to the fourth embodiment of the present invention.

The operation sequence of this embodiment will be explained below with reference to the flow chart in FIG. 11.

After power ON in step S41, the original image scanning apparatus 30 executes initialization in step S42 to complete preparation for image scans, and waits until the start/stop switch is pressed.

In step S43, the number of times the start/stop switch has been pressed is counted. If the start/stop switch has been pressed once, the flow advances to step S44 to start an original scan.

If the start/stop switch has been pressed twice, the flow advances to step S45 to execute white shading.

If the start/stop switch has been pressed three times, the flow advances to step S46 to execute black shading.

Upon completion of step S44, S45, or S46, the flow returns to step S43 to wait until the start/stop switch is pressed again.

(Fifth Embodiment)

In the fifth embodiment, in addition to operation for changing and executing the function of the original image scanning apparatus 30 depending on the number of times the start/stop switch is pressed like the fourth embodiment, the time interval between depressions of the start/stop switch is measured, and the function of the image scanning apparatus is also changed depending on the measured time interval.

Figure 12:
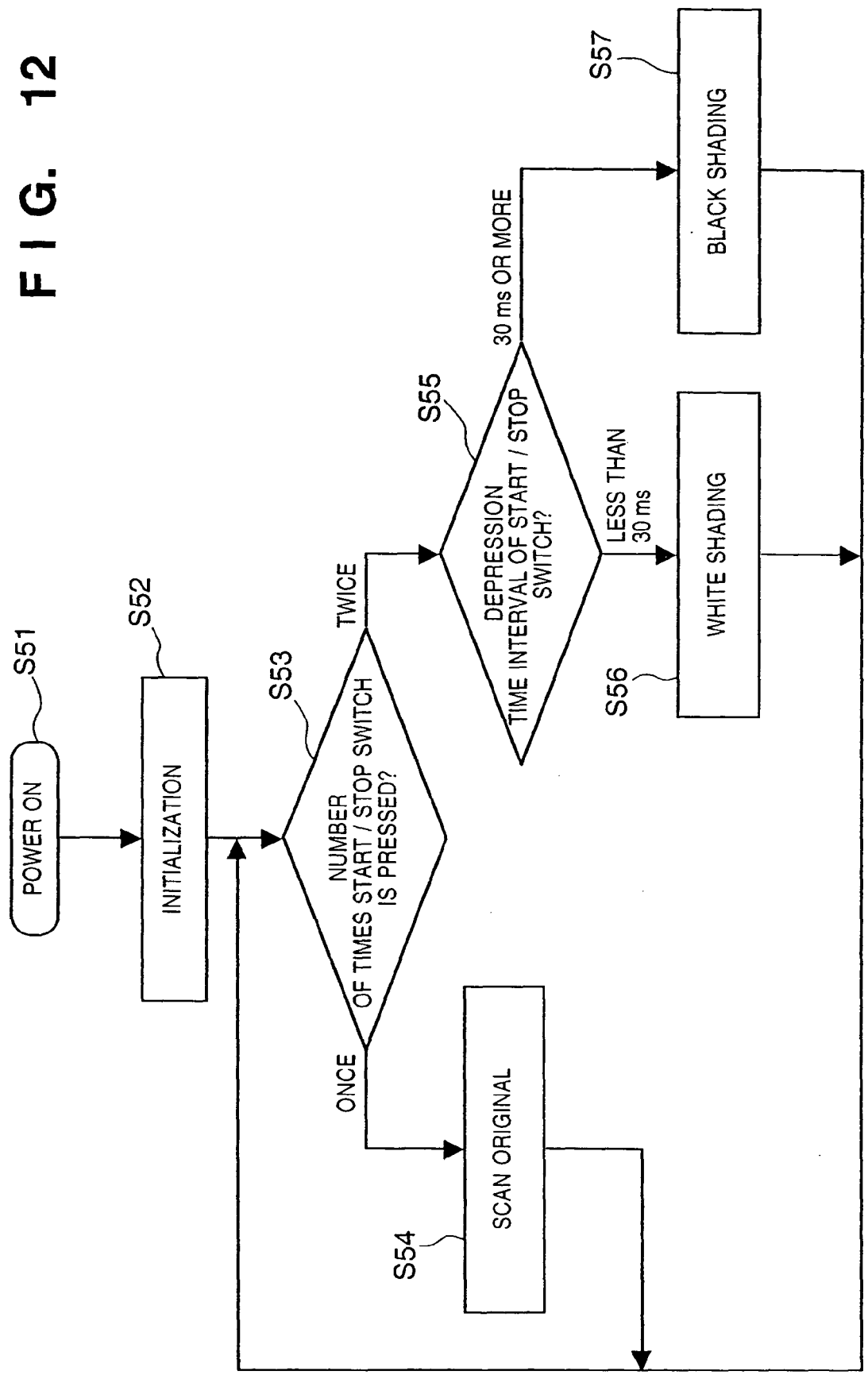
FIG. 12 is a flow chart showing the processing according to the fifth embodiment of the present invention.

FIG. 12 is a flow chart showing the processing sequence of this embodiment. After power ON in step S51, the original image scanning apparatus 30 shown in FIG. 7 performs initialization in step S52 to complete preparation for image scans, and waits until the start/stop switch is pressed.

In step S53, the number of times the start/stop switch has been pressed is counted. If the start/stop switch has been pressed once, the flow advances to step S54 to start an original scan.

If the start/stop switch has been pressed twice, the flow advances to step S55 to measure the time interval between depressions of the start/stop switches. If the time interval is less than 30 ms, the flow advances to step S56 to execute white shading. On the other hand, if the time interval is equal to or longer than 30 ms, the flow advances to step S57 to execute black shading.

Upon completion of step S54, 56, or S57, the flow returns to step S53 to wait until the start/stop switch is pressed.

According to this control, when the number of times the start/stop switch is pressed is small, more functions of the original image scanning apparatus can be executed.

To recapitulate, according to the fourth and fifth embodiments, the function of the original image scanning apparatus can be changed depending on the number of times the external switch is pressed per unit time, and the depression time interval, and a plurality of functions of the image scanning apparatus can be executed by the single external switch.

(Sixth Embodiment)

In the sixth embodiment, since the arrangement of an image scanning apparatus is the same as that in the second embodiment shown in FIG. 7, a detailed description thereof will be omitted.

Figure 13:
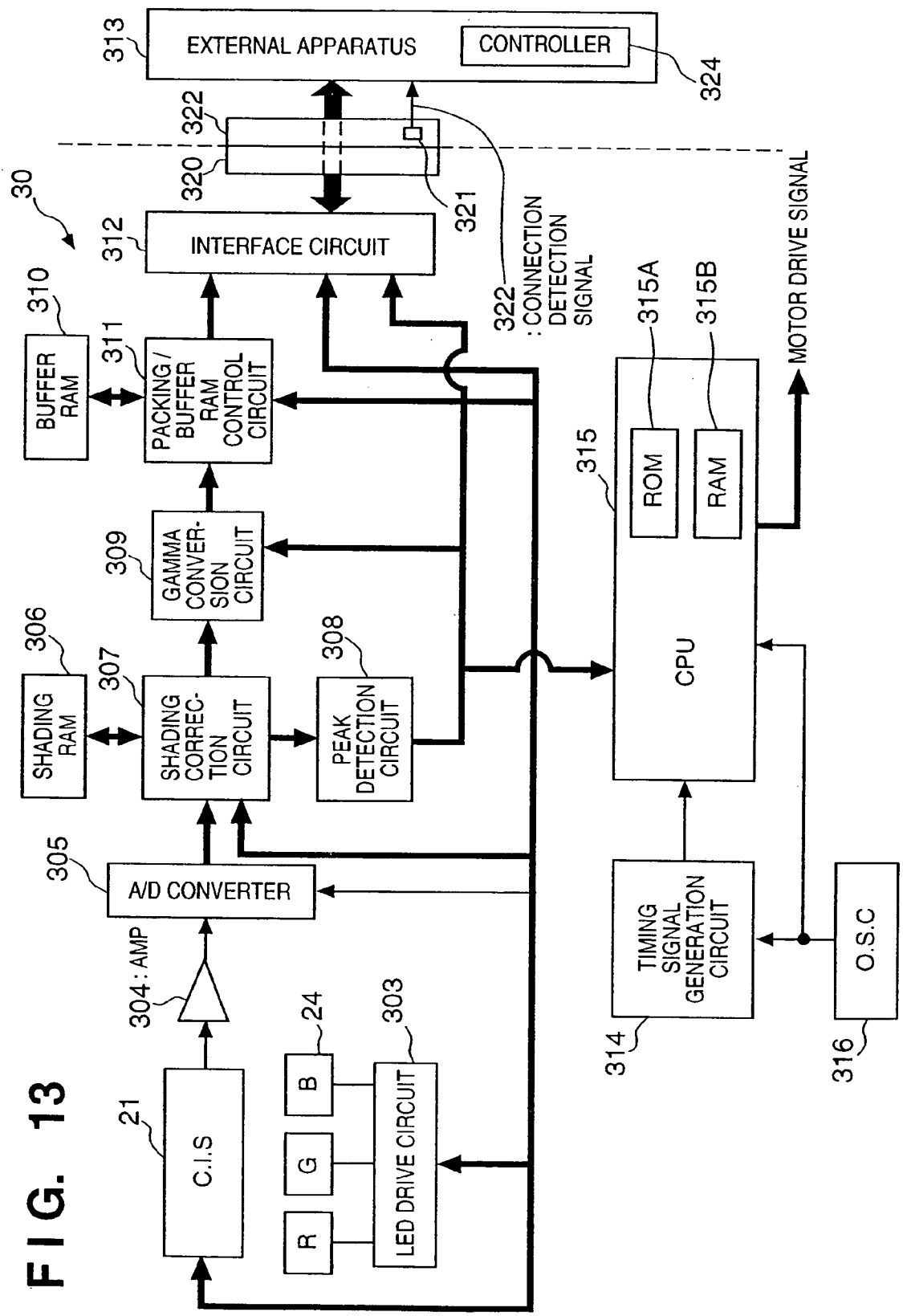
FIG. 13 is a block diagram showing the electrical arrangement of an image scanning system according to the sixth embodiment of the present invention.

FIG. 13 is a block diagram showing the arrangement of a control circuit in this embodiment.

The circuit operation of this embodiment will be explained below with the aid of FIG. 13.

Referring to FIG. 13, reference numeral 21 denotes the already explained CIS, which is also integrated with the LED array 24 serving as a light source. While an original placed on the contact glass 25 of the CIS 21 is fed, an LED control circuit 203 selectively turns on the respective color LEDs in units of lines, thus scanning R, G, and B line-sequential color images.

An AMP 304 is an amplifier for amplifying a signal output from the CIS 21. Reference numeral 305 denotes an A/D converter for A/D-converting the amplified output to output, e.g., an 8-bit digital signal.

A shading RAM 306 stores shading correction data obtained by scanning a calibration sheet in advance, and a shading correction circuit 307 performs shading correction of the scanned image signal on the basis of the data stored in the shading RAM 306. A peak detection circuit 308 detects peak values in the scanned image data in units of lines, and is used for detecting the leading end of an original.

A gamma conversion circuit 309 performs gamma conversion of the scanned image data in accordance with a gamma curve set in advance by a host computer (in this case, an external apparatus 313).

A buffer RAM 310 temporarily stores image data to adjust the actual scanning timing to the communication timing with the host computer. A packing/buffer RAM control circuit 311 executes a process for packing data in accordance with an image output mode (binary, 4-bit multi-valued, 8-bit multi-valued, 24-bit multi-valued) set in advance by the host computer, and writing the packed data in the buffer RAM 310, and a process for reading out image data from the buffer RAM 310 and outputting that data to an interface circuit 312.

The interface circuit 312 exchanges control signals and outputs an image signal with the external apparatus 313 such as a personal computer or the like, which serves as a host apparatus of the image scanning apparatus 30.

A connector 320 connects the image scanning apparatus 30 and external apparatus 313, and comprises a detector 321 which detects whether the image scanning apparatus 30 is connected to the external apparatus 313 or disconnected therefrom, on the basis of, e.g., changes in resistance, current, voltage, or the like, periodic communications, detection by means of a photocoupler, or the like, and outputting a connection state detection signal 322.

When the external apparatus 313 detects based on the connection state detection signal 322 that the image scanning apparatus is connected, its controller 324 automatically starts image scanning software while power is kept ON, and outputs an image scan control signal to the image scanning apparatus 30. In response to this signal, the image scanning apparatus 30 feeds and scans an original, and outputs an image signal to the external apparatus 313. The external apparatus 313 receives that image signal.

Reference numeral 315 denotes a CPU in the form of, e.g., a microcomputer, which has a ROM 315A storing the processing sequence, and a work RAM 315B. The CPU 315 controls the respective units in accordance with the sequence stored in the ROM 315A.

Reference numeral 316 denotes, e.g., a quartz oscillator; and 314, a timing signal generation circuit for generating various timing signals that serve as references for operations by frequency-dividing the oscillator 316 in accordance with the setups of the CPU 315.

Figure 14:
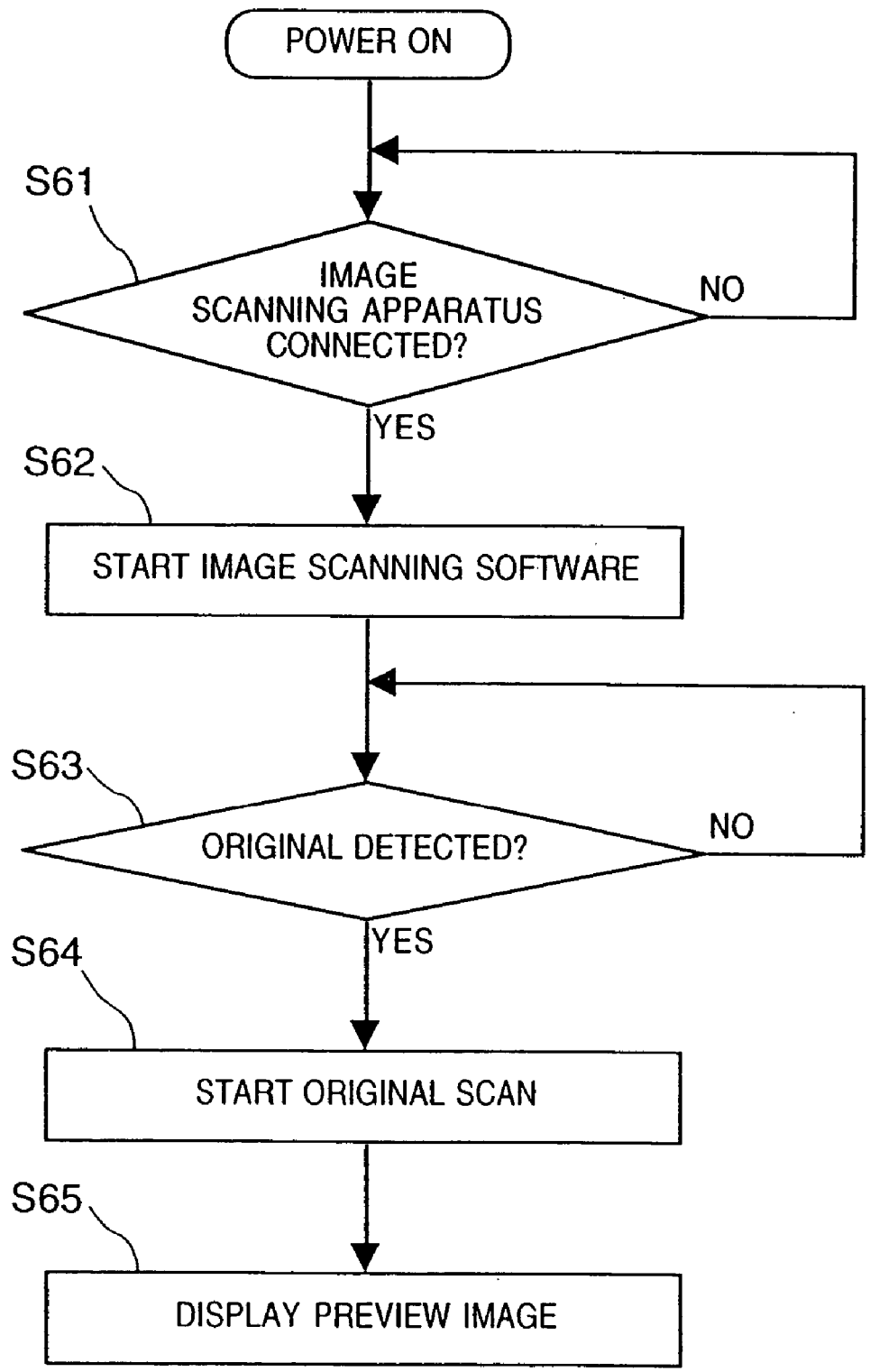
FIG. 14 is a flow chart showing the processing of the sixth embodiment.

A method of controlling the image scanning apparatus of this embodiment will be described below with reference to the flow chart shown in FIG. 14.

After power ON, if the external apparatus 313 detects in step S61 that the image scanning apparatus 30 is connected, the flow advances to step S62 to start image scanning software. In step S63, the image scanning apparatus 30 checks the presence/absence of an original. If an original is detected, the flow advances to step S64 to start an original scan. In step S65, the external apparatus 313 displays image data sent from the image scanning apparatus 30 on its display.

(Seventh Embodiment)

In the sixth embodiment, an image scanning apparatus that feeds an original (sheet-feed type) has been exemplified. In the seventh embodiment, an image scanning apparatus which scans an image without feeding an original (flat-bed type) will be described.

Figure 15:
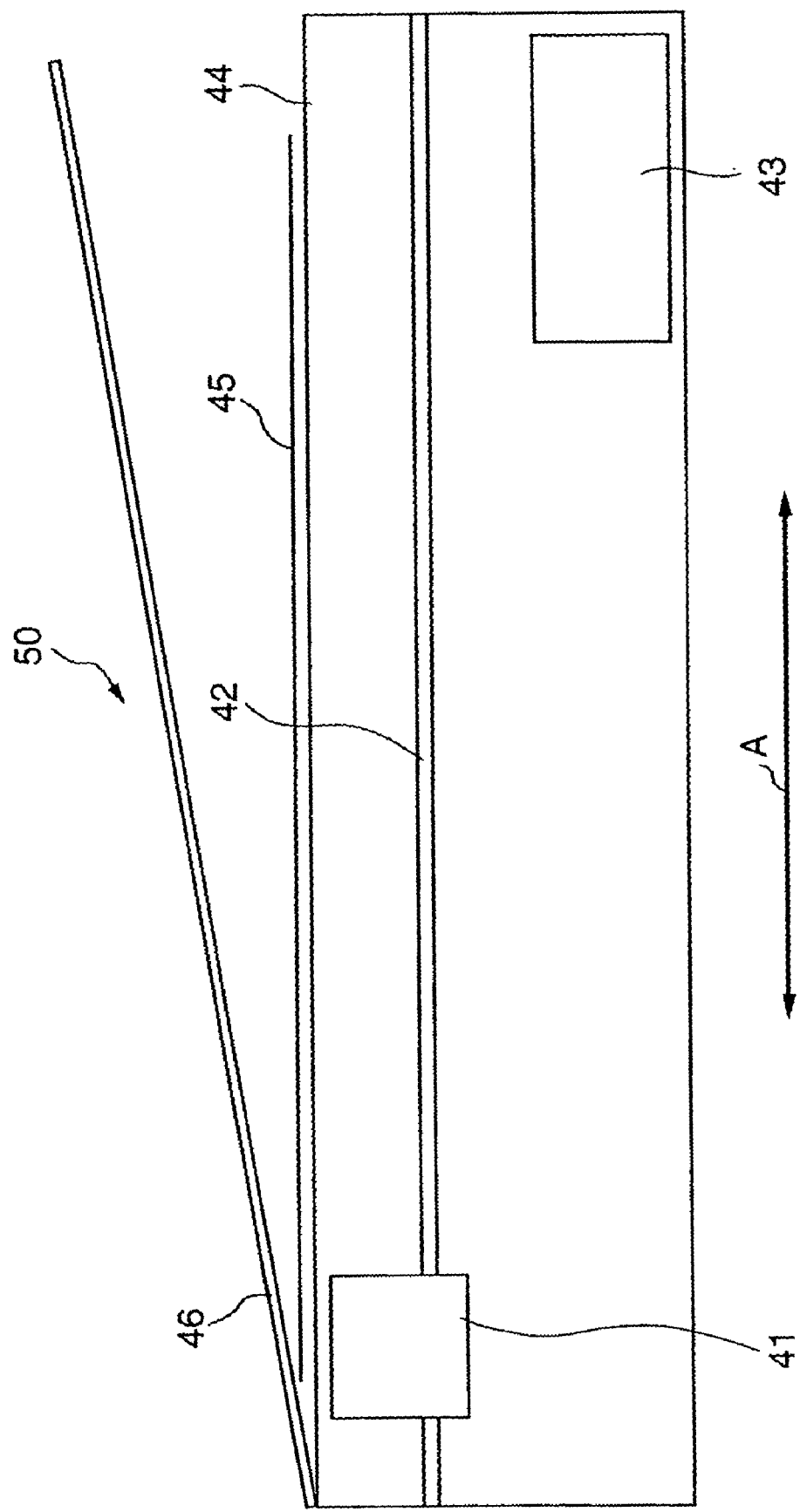
FIG. 15 is a view showing the internal arrangement of an image scanning apparatus according to the seventh embodiment of the present invention.

FIG. 15 shows the internal arrangement of an image scanning apparatus according to the seventh embodiment of the present invention.

Referring to FIG. 15, reference numeral 50 denotes a flat-bed type image scanning apparatus, which is composed of a CIS 41, a guide shaft 42 serving as a guide for moving the CIS 41 in the directions of a double-headed arrow A, a motor 43 serving as a driving source for moving the CIS 41 in the directions of the double-headed arrow A, a glass plate 44 for placing an original 45, and a pressure plate 46 for pressing the original 45 against the glass plate 44. When the original 45 is placed on the glass plate 44 and the CIS 41 is scanned in the directions of the double-headed arrow A to start a scan, information on the original 45 can be read.

Note that the arrangement of a control circuit is the same as that in the sixth embodiment shown in FIG. 13, and a detailed description thereof will be omitted.

Figure 16:
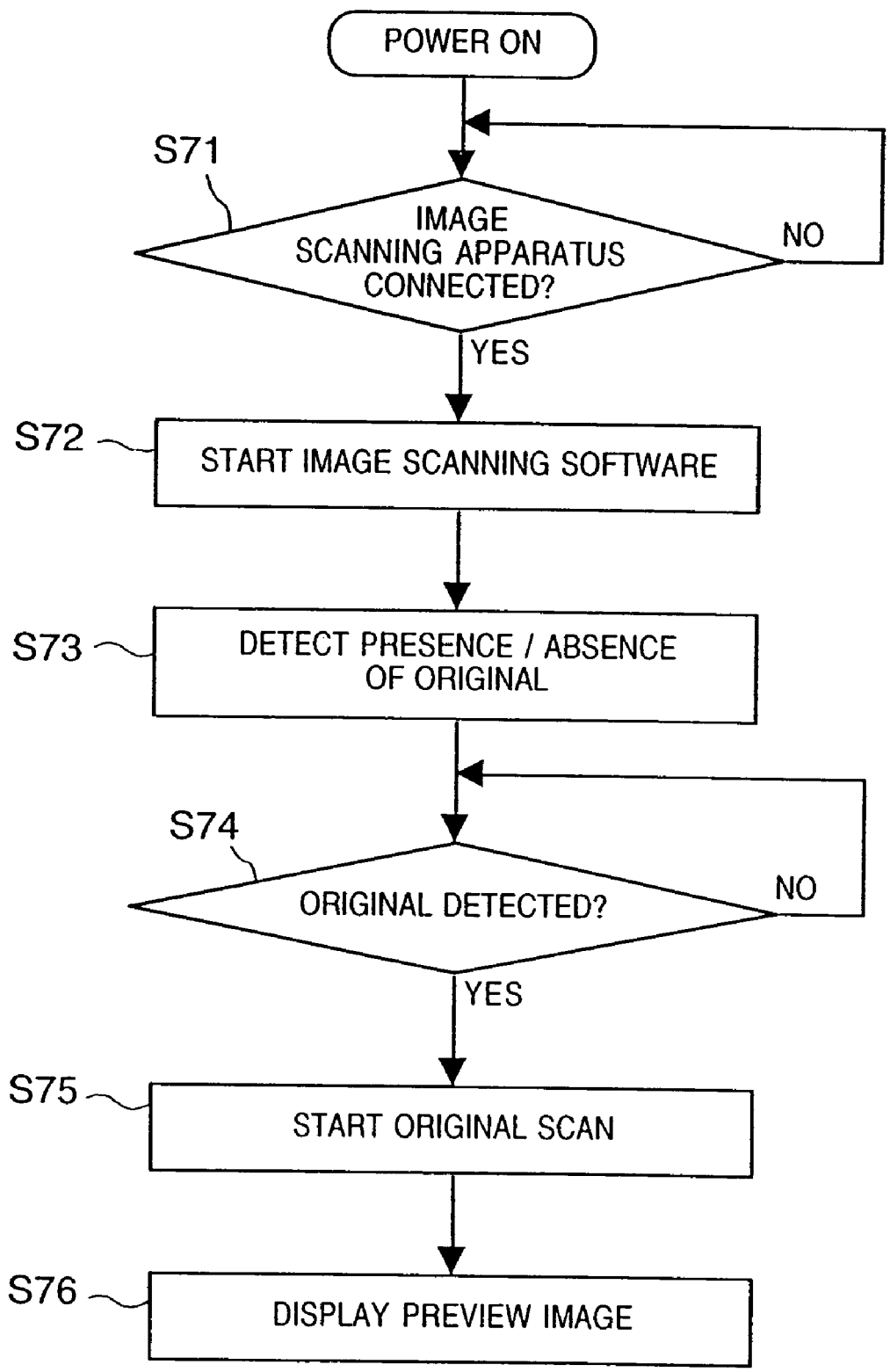
FIG. 16 is a flow chart showing the processing of the seventh embodiment.

A method of controlling the image scanning apparatus of this embodiment will be explained below with reference to the flow chart shown in FIG. 16.

After power ON, if the external apparatus 313 detects in step S71 that the image scanning apparatus 50 is connected, the flow advances to step S72 to start image scanning software. In step S73, the image scanning apparatus 50 checks the presence/absence of the original 45 by moving the CIS 41 in the directions of the double-headed arrow A by the motor 43. If the original is detected (YES in step S74), the flow advances to step S75 to start a scan of the original 45. In step S76, the external apparatus 313 displays image data sent from the image scanning apparatus 50 on its display.

In the sixth and seventh embodiments, an image scanner has been exemplified as an image scanning apparatus. However, the present invention can be similarly applied to other image scanning apparatuses such as a video camera, digital camera, and the like.

As described above, according to the sixth and seventh embodiments, when the user connects the image scanning apparatus to the external apparatus, image scanning software is started on the external apparatus, and the user can easily see a preview image. In this way, an original image can be confirmed without any complicated procedure.

(Eighth Embodiment)

In the eighth embodiment, the arrangements of an image scanning apparatus and its control circuit are the same as those in the sixth embodiment described above, except for operations. Hence, only different operations will be explained below.

Figure 17:
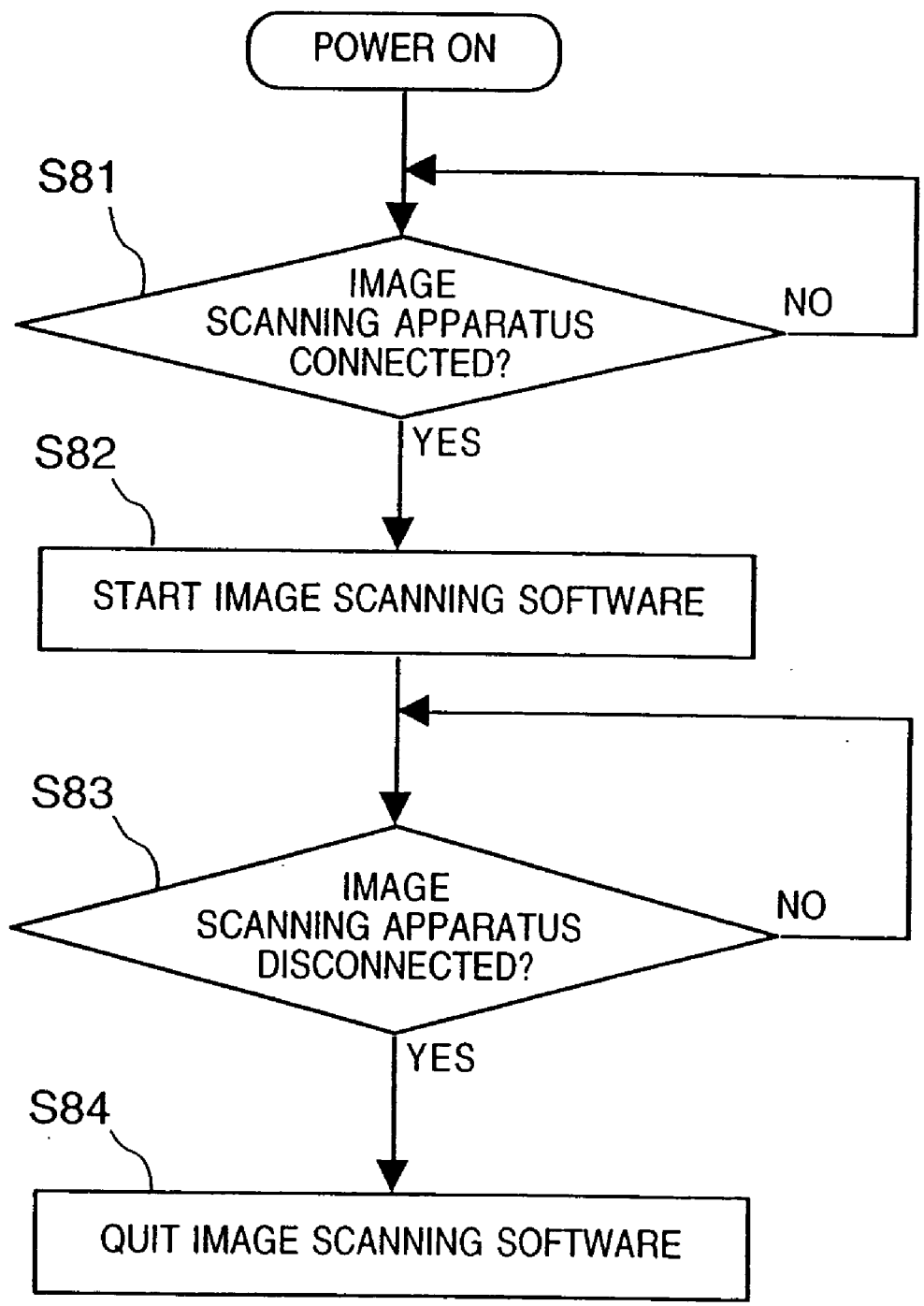
FIG. 17 is a flow chart showing the processing according to the eighth embodiment of the present invention.

FIG. 17 is a flow chart showing the control operation of the image scanning apparatus of this embodiment.

A method of controlling the image scanning apparatus of this embodiment will be explained below with reference to the flow chart shown in FIG. 17.

After power ON, if the external apparatus 313 detects in step S81 that the image scanning apparatus 30 is connected, the flow advances to step S82 to start image scanning software. In step S83, the image scanning apparatus 30 performs an image scan, and the like until it is disconnected from the external apparatus 313. If the image scanning apparatus 30 is disconnected from the external apparatus 313, the flow advances to step S84 to automatically quit image scanning software.

(Ninth Embodiment)

In the eighth embodiment, an image scanning apparatus that feeds an original (sheet-feed type) has been exemplified. In the ninth embodiment, an image scanning apparatus which scans an image without feeding an original (flat-bed type) will be described.

Note that the arrangement of the flat-bed type image scanning apparatus in this embodiment is the same as that in the seventh embodiment shown in FIG. 15, and a detailed description thereof will be omitted.

Also, since the arrangement of a control circuit is the same as that in the sixth embodiment shown in FIG. 13, a detailed description thereof will be omitted.

A method of controlling the image scanning apparatus of this embodiment will be explained below with reference to the flow chart shown in FIG. 17.

After power ON, if the external apparatus 313 detects in step S81 that the image scanning apparatus 50 is connected, the flow advances to step S82 to start image scanning software. In step S83, the image scanning apparatus 50 performs an image scan, and the like until it is disconnected from the external apparatus 313. If the image scanning apparatus 50 is disconnected from the external apparatus 313, the flow advances to step S84 to automatically quit image scanning software.

In the eighth and ninth embodiments, an image scanner has been exemplified as an image scanning apparatus. However, the present invention can be similarly applied to other image scanning apparatuses such as a video camera, digital camera, and the like.

To restate, according to the eighth and ninth embodiments, when the user connects the image scanning apparatus to the external apparatus, image scanning software is started on the external apparatus, and an image can be easily scanned. When the user wants to disconnect the image scanning apparatus from the external apparatus upon completion of the image scan, he or she need only disconnect the image scanning apparatus from the external apparatus, and the image scanning software automatically quits, thus easily ending the image scan. In this way, an original scan can be easily started and ended without any complicated procedure.

OTHER EMBODIMENTS

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications can be made within the spirit and scope of the present invention. Therefore, to apprise the public of the scope of the present invention the following claims are made.

What is claimed is:

1. An image scanning system comprising:
    an image scanning apparatus adapted to scan information on an object using an image sensor, and outputting an electrical image signal to an external unit; and
    an external apparatus adapted to control said image scanning apparatus, and displaying the image signal output from said image scanning apparatus, wherein said external apparatus comprises connection means adapted to connect said image scanning apparatus to said external apparatus, detection means for detecting if said image scanning apparatus is connected to said external apparatus by said connection means, and control means adapted to start software for controlling said image scanning apparatus when said detection means detects that said image scanning apparatus is connected to said external apparatus, and
    wherein in response to the start of the software, said image scanning apparatus scans an original and outputs the scanned image signal to said external apparatus.

2. The system according to claim 1, wherein said image scanning apparatus comprises an A/D converter adapted to convert the image signal output from the image sensor into a digital signal, and transfer means adapted to transfer the digital image signal to said external apparatus.

3. A method of controlling an image scanning system which comprises an image scanning apparatus for scanning information on an object using an image sensor, and outputting an electrical image signal to an external unit, and an external apparatus for controlling said image scanning apparatus, and displaying the image signal output from said image scanning apparatus, comprising:
    the detection step of detecting if said image scanning apparatus is connected to said external apparatus; and
    the start step adapted to start software for controlling said image scanning apparatus on the basis of a detection result in the detection step when it is detected in the detection step that said image scanning apparatus is connected to said external apparatus, and
    wherein in response to the start of the software, said image scanning apparatus scans an original and outputs the scanned image signal to said external apparatus.

4. The method according to claim 3, wherein said image scanning apparatus comprises an A/D converter adapted to concert the image signal output from the image sensor into a digital signal, and transfer means adapted to transfer the digital image signal to said external apparatus.

5. The method according to claim 3, further including a step of detecting whether or not an original is present for scanning.

6. A computer-readable storage medium storing a control program for controlling an image scanning system which comprises an image scanning apparatus adapted to scan information on an object using an image sensor, and outputting an electrical image signal to an external unit, and an external apparatus adapted to control said image scanning apparatus, and displaying the image signal output from said image scanning apparatus, said control program having:
 a code of the detection step of detecting if said image scanning apparatus is connected to said external apparatus; and a code of the start step of starting software for controlling said image scanning apparatus on the basis of a detection result in the detection step, wherein the start step includes the step of starting the software when it is detected in the detection step that said image scanning apparatus is connected to said external apparatus, and
 wherein in response to the start of the software, said image scanning apparatus scans an original and outputs the scanned image signal to said external apparatus.

7. The method according to claim 6, further including a code of detecting whether or not an original is present for scanning.

8. An external apparatus which is connected to an image scanning apparatus adapted to scan information on an object using an image sensor, and outputting an electrical image signal to an external unit, and controls the image scanning apparatus, comprising:
 connection means adapted to connect the image scanning apparatus to said external apparatus;
 detection means adapted to detect if the image scanning apparatus is connected to said external apparatus by said connection means; and
 control means adapted to start software for controlling the image scanning apparatus on the basis of a detection signal from said detection means when said detection means detects that the image scanning apparatus is connected to said external apparatus, and
 wherein in response to the start of the software, the image scanning apparatus scans an original and outputs the scanned image signal to said external apparatus.

9. An image scanning system comprising:
 an image scanning apparatus adapted to scan information on an object using an image sensor, and outputting an electrical image signal to an external unit; and
 an external apparatus adapted to control said image scanning apparatus, and displaying the image signal output from said image scanning apparatus when said detection means detects that said image scanning apparatus is connected to said external apparatus, and quits the software when said detection means detects that said image scanning apparatus is disconnected from said external apparatus, and
 wherein said external apparatus comprises connection means adapted to connect said image scanning apparatus to said external apparatus, detection means adapted to detect whether or not said image scanning apparatus is connected to said external apparatus by said connection means, and control means for controlling whether software for controlling said image scanning apparatus is started or quitted on the basis of a detection signal from said detection means.

10. The system according to claim 9, wherein said image scanning apparatus comprises an A/D converter adapted to convert the image signal output from the image sensor into a digital signal, and transfer means adapted to transfer the digital image signal to said external apparatus.

11. The system according to claim 9, wherein in response to the start of the software, said image scanning apparatus scans an original and outputs the scanned image signal to said external apparatus.

12. A method of controlling an image scanning system which comprises an image scanning apparatus adapted to scan information on an object using an image sensor, and outputting an electrical image signal to an external unit, and an external apparatus adapted to control said image scanning apparatus, and displaying the image signal output from said image scanning apparatus, comprising:
 the detection step of detecting whether or not said image scanning apparatus is connected to said external apparatus by said connection means; and
 the setting step of setting whether software for controlling said image scanning apparatus in said external apparatus when it is detected in the detection step that said image scanning apparatus is connected to said external apparatus, and quitting the software when it is detected in the detection step that said image scanning apparatus is disconnected from said external apparatus.

13. The method according to claim 12, wherein said image scanning apparatus comprises an A/D converter adapted to convert the image signal output from the image sensor into a digital signal, and transfer means adapted to transfer the digital image signal to said external apparatus.

14. The method according to claim 12, wherein in response to the start of the software, said image scanning apparatus scans an original and outputs the scanned image signal to said external apparatus.

15. The method according to claim 12, further including a step of detecting whether or not an original is present for scanning.

16. A computer-readable storage medium that stores a control program for controlling an image scanning system which comprises an image scanning apparatus for scanning information on an object using an image sensor, and outputting an electrical image signal to an external unit, and an external apparatus adapted to control said image scanning apparatus, and displaying the image signal output from said image scanning apparatus, said control program comprising:
 a code of the detection step of detecting whether or not said image scanning apparatus is connected to said external apparatus by said connection means; and
 a code of the setting step of setting whether software for controlling said image scanning apparatus in said external apparatus when it is detected in the detection step that said image scanning apparatus is connected to said external apparatus, and quitting the software when it is detected in the detection step that said image scanning apparatus is disconnected from said external apparatus.

17. The method according to claim 16, further including a code of detecting whether or not an original is present for scanning.

18. An external apparatus which is connected to an image scanning apparatus adapted to scan information on an object using an image sensor, and externally outputting an electrical image signal, and controls the image scanning apparatus, comprising:
 connection means adapted to connect the image scanning apparatus to said external apparatus;
 detection means adapted to detect whether or not the image scanning apparatus is connected to said external apparatus by said connection means; and control means adapted to control whether software for controlling said image scanning apparatus when said detection means detects that the image scanning apparatus is connected to said external apparatus, and quits the software when said detection means detects that the image scanning apparatus is disconnected from said external apparatus.

* * * * *

UNITED STATES PATENT AND TRADEMARK OFFICE
CERTIFICATE OF CORRECTION

PATENT NO. : 7,167,282 B2
APPLICATION NO. : 10/638382
DATED : January 23, 2007
INVENTOR(S) : Suzuki et al.

It is certified that error appears in the above-identified patent and that said Letters Patent is hereby corrected as shown below:

On the Title Page, Item (56) References Cited, Foreign References:
 change "JP  5083948  4/1993" to --JP  5083498  4/1993--; and In Column 16, Line 65:
 change "concert" --convert--.

Signed and Sealed this

Tenth Day of April, 2007

JON W. DUDAS
*Director of the United States Patent and Trademark Office*